US008301912B2

(12) United States Patent
Lin et al.

(10) Patent No.: US 8,301,912 B2
(45) Date of Patent: Oct. 30, 2012

(54) SYSTEM, METHOD AND MEMORY DEVICE PROVIDING DATA SCRAMBLING COMPATIBLE WITH ON-CHIP COPY OPERATION

(75) Inventors: Jason T. Lin, Santa Clara, CA (US); Steven S. Cheng, Sunnyvale, CA (US); Shai Traister, San Jose, CA (US)

(73) Assignee: SanDisk Technologies Inc., Plano, TX (US)

(*) Notice: Subject to any disclaimer, the term of this patent is extended or adjusted under 35 U.S.C. 154(b) by 721 days.

(21) Appl. No.: 12/345,921

(22) Filed: Dec. 30, 2008

(65) Prior Publication Data
US 2009/0204824 A1 Aug. 13, 2009

Related U.S. Application Data

(60) Provisional application No. 61/018,096, filed on Dec. 31, 2007.

(51) Int. Cl.
*G06F 12/14* (2006.01)
(52) U.S. Cl. ........................................ 713/193
(58) Field of Classification Search .............. 713/193
See application file for complete search history.

(56) References Cited

U.S. PATENT DOCUMENTS

| | | | |
|---|---|---|---|
| 5,587,959 A | 12/1996 | Tsukude | |
| 5,592,436 A | 1/1997 | Toda | |
| 5,619,576 A * | 4/1997 | Shaw | ............................. 380/44 |
| 5,689,473 A | 11/1997 | Toda | |
| 5,706,248 A | 1/1998 | Toda | |
| 5,911,062 A | 6/1999 | Taki | |
| 5,915,025 A * | 6/1999 | Taguchi et al. | ................. 380/44 |
| 5,943,283 A | 8/1999 | Wong et al. | |
| 6,094,368 A | 7/2000 | Ching | |
| 6,307,776 B1 | 10/2001 | So et al. | |
| 6,549,468 B2 | 4/2003 | Zitlaw et al. | |
| 6,621,745 B1 | 9/2003 | Manea | |
| 6,684,289 B1 | 1/2004 | Gonzalez et al. | |
| 6,856,572 B2 | 2/2005 | Scheuerlein et al. | |
| 6,917,539 B2 | 7/2005 | Rinerson et al. | |
| 6,977,855 B2 | 12/2005 | Callaway et al. | |
| 7,012,835 B2 | 3/2006 | Gonzalez et al. | |
| 7,139,864 B2 | 11/2006 | Bennett et al. | |
| 7,177,169 B2 | 2/2007 | Scheuerlein | |

(Continued)

OTHER PUBLICATIONS

International Search Report and Written Opinion mailed Mar. 19, 2009 for App. No. PCT/US2008/088625, 7 pages.

(Continued)

*Primary Examiner* — Cordelia Zecher
(74) *Attorney, Agent, or Firm* — Zagorin O'Brien Graham LLP

(57) ABSTRACT

Data scrambling techniques implemented externally to a flash memory device are disclosed which can be used in concert with flash memory on-chip copy functionality operating internally to the flash device, thus supporting high performance copying operations. All the data stored in the flash may be scrambled, including headers and control structures. Robust file system operation may be achieved, including the capability to tolerate a power loss at any time, and yet be able to relocate data internally within the flash without having to de-scramble and then re-scramble the data. An exemplary hardware based solution has little or no impact on overall system performance, and may be implemented at very low incremental cost to increase overall system reliability. The data scrambling technique preferably uses a logical address, such as logical block address or logical page address, rather than a physical address, to determine a seed scrambling key.

57 Claims, 15 Drawing Sheets

Data Pattern Scrambler/Descrambler Block Diagram

U.S. PATENT DOCUMENTS

| | | |
|---|---|---|
| 7,349,267 B2 | 3/2008 | Kuroda |
| 7,464,216 B2 | 12/2008 | Gorobets |
| 7,512,813 B2 * | 3/2009 | Goodnow et al. .............. 713/193 |
| 2003/0126451 A1 * | 7/2003 | Gorobets ....................... 713/189 |
| 2005/0141329 A1 | 6/2005 | Beat |
| 2005/0144365 A1 * | 6/2005 | Gorobets et al. .............. 711/103 |
| 2005/0201401 A1 | 9/2005 | Lasser |
| 2005/0213393 A1 | 9/2005 | Lasser |
| 2006/0026341 A1 | 2/2006 | Lasser |
| 2006/0156189 A1 | 7/2006 | Tomlin |
| 2006/0184724 A1 | 8/2006 | Meir et al. |
| 2007/0089034 A1 | 4/2007 | Litsyn et al. |
| 2007/0124652 A1 | 5/2007 | Litsyn et al. |
| 2007/0208905 A1 | 9/2007 | Litsyn et al. |
| 2007/0217608 A1 | 9/2007 | Shimasaki |
| 2007/0220197 A1 | 9/2007 | Lasser |
| 2008/0151618 A1 | 6/2008 | Sharon et al. |
| 2008/0158948 A1 | 7/2008 | Sharon et al. |
| 2008/0215798 A1 | 9/2008 | Sharon et al. |
| 2008/0317246 A1 | 12/2008 | Manders et al. |
| 2009/0083485 A1 | 3/2009 | Cheng |
| 2009/0150596 A1 | 6/2009 | Cheng |

OTHER PUBLICATIONS

European Supplementary Search Report and Written Opinion, mailed Mar. 11, 2011 in EP App. No. 08869563.0, 5 pages.

* cited by examiner

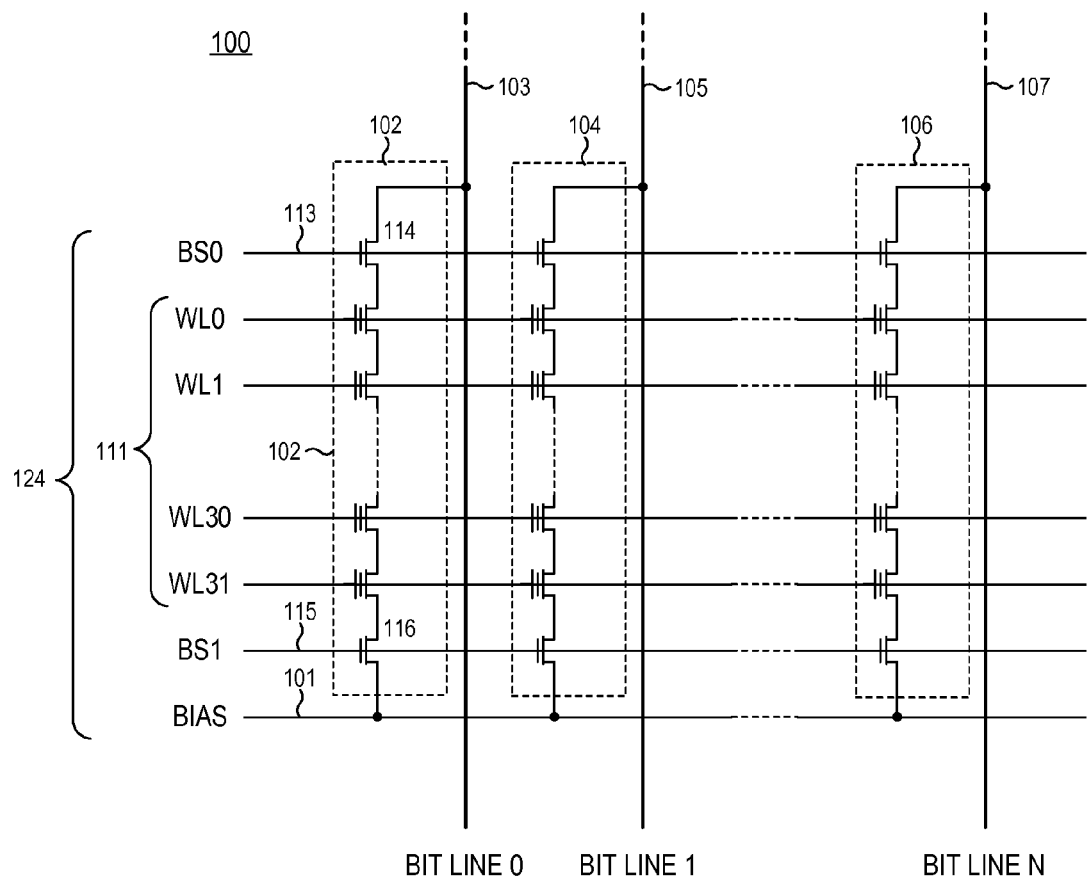
FIG. 1 (prior art)
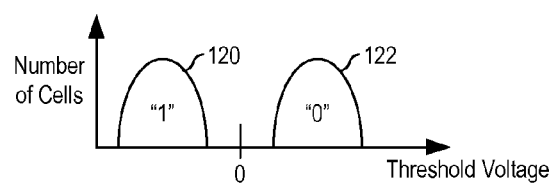
FIG. 2A
FIG. 2B
FIG. 2C

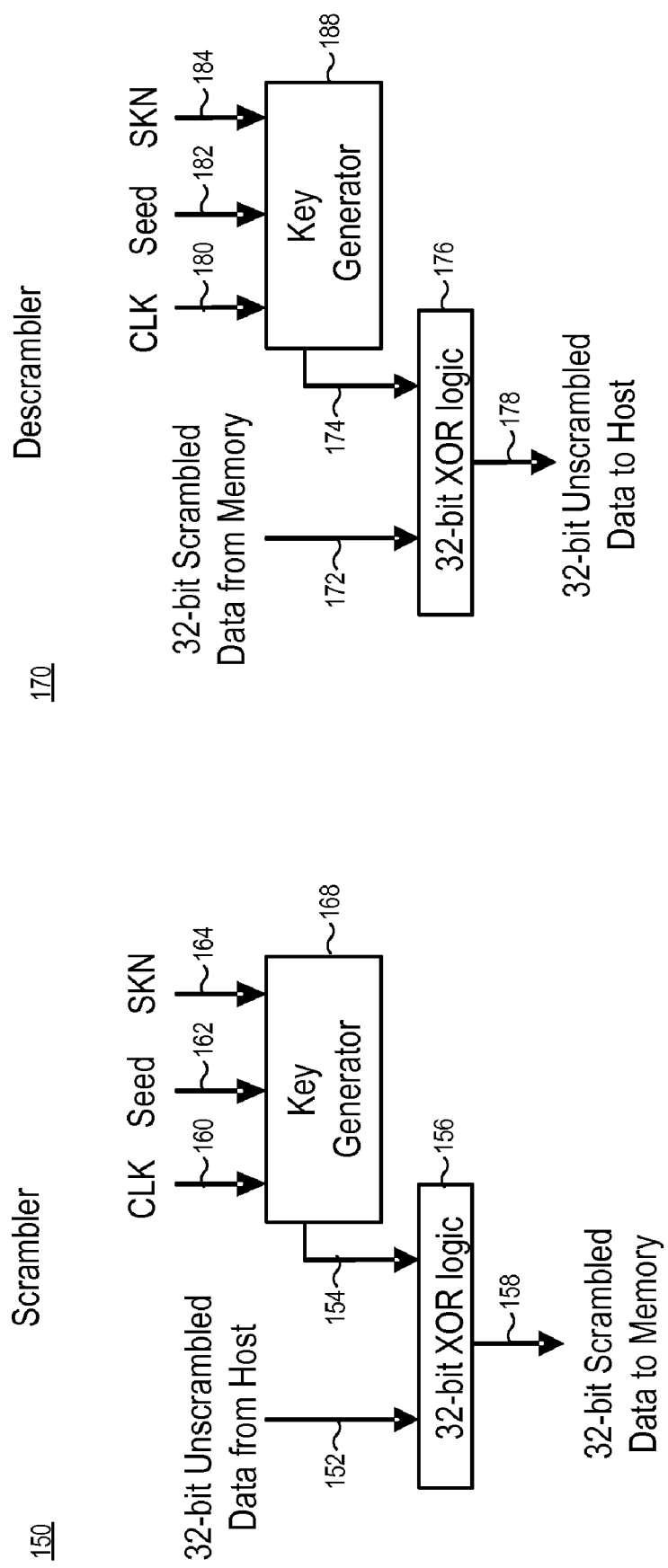

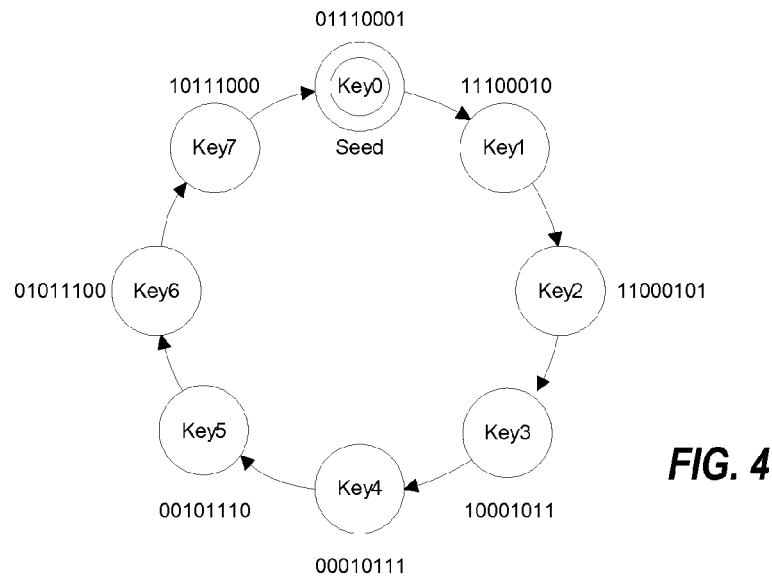

Exemplary Sequence based on Seed of 0x71
rotating left with 8-bit shifter

FIG. 4

Exemplary Sequence based on Seed of 0x695334C6
rotating left with Shifter size of 32

Rotation Length:    32
Rotation Direction: Left

| # of | Cnt |
|------|-----|
| 0's  | 16  |
| 1's  | 16  |

| Key Sequence | Key # | Shifter Output | | | |
|---|---|---|---|---|---|
| | | Byte 3 | Byte 2 | Byte 1 | Byte 0 |
| 0x69C734C6 | 0  | 01101001 | 11000111 | 00110100 | 11000110 |
| 0xD38E698C | 1  | 11010011 | 10001110 | 01101001 | 10001100 |
| 0xA71CD319 | 2  | 10100111 | 00011100 | 11010011 | 00011001 |
| 0x4E39A633 | 3  | 01001110 | 00111001 | 10100110 | 00110011 |
| 0x9C734C66 | 4  | 10011100 | 01110011 | 01001100 | 01100110 |
| 0x38E698CD | 5  | 00111000 | 11100110 | 10011000 | 11001101 |
| 0x71CD319A | 6  | 01110001 | 11001101 | 00110001 | 10011010 |
| 0xE39A6334 | 7  | 11100011 | 10011010 | 01100011 | 00110100 |
| 0xC734C669 | 8  | 11000111 | 00110100 | 11000110 | 01101001 |
| 0x8E698CD3 | 9  | 10001110 | 01101001 | 10001100 | 11010011 |
| 0x1CD319A7 | 10 | 00011100 | 11010011 | 00011001 | 10100111 |
| 0x39A6334E | 11 | 00111001 | 10100110 | 00110011 | 01001110 |
| 0x734C669C | 12 | 01110011 | 01001100 | 01100110 | 10011100 |
| 0xE698CD38 | 13 | 11100110 | 10011000 | 11001101 | 00111000 |
| 0xCD319A71 | 14 | 11001101 | 00110001 | 10011010 | 01110001 |
| 0x9A6334E3 | 15 | 10011010 | 01100011 | 00110100 | 11100011 |
| 0x34C669C7 | 16 | 00110100 | 11000110 | 01101001 | 11000111 |
| 0x698CD38E | 17 | 01101001 | 10001100 | 11010011 | 10001110 |
| 0xD319A71C | 18 | 11010011 | 00011001 | 10100111 | 00011100 |
| 0xA6334E39 | 19 | 10100110 | 00110011 | 01001110 | 00111001 |
| 0x4C669C73 | 20 | 01001100 | 01100110 | 10011100 | 01110011 |
| 0x98CD38E6 | 21 | 10011000 | 11001101 | 00111000 | 11100110 |
| 0x319A71CD | 22 | 00110001 | 10011010 | 01110001 | 11001101 |
| 0x6334E39A | 23 | 01100011 | 00110100 | 11100011 | 10011010 |
| 0xC669C734 | 24 | 11000110 | 01101001 | 11000111 | 00110100 |
| 0x8CD38E69 | 25 | 10001100 | 11010011 | 10001110 | 01101001 |
| 0x19A71CD3 | 26 | 00011001 | 10100111 | 00011100 | 11010011 |
| 0x334E39A6 | 27 | 00110011 | 01001110 | 00111001 | 10100110 |
| 0x669C734C | 28 | 01100110 | 10011100 | 01110011 | 01001100 |
| 0xCD38E698 | 29 | 11001101 | 00111000 | 11100110 | 10011000 |
| 0x9A71CD31 | 30 | 10011010 | 01110001 | 11001101 | 00110001 |
| 0x34E39A63 | 31 | 00110100 | 11100011 | 10011010 | 01100011 |

FIG. 5

Byte Offset Number Example with 32-bit Keys and Sector 0 size of 518 Bytes

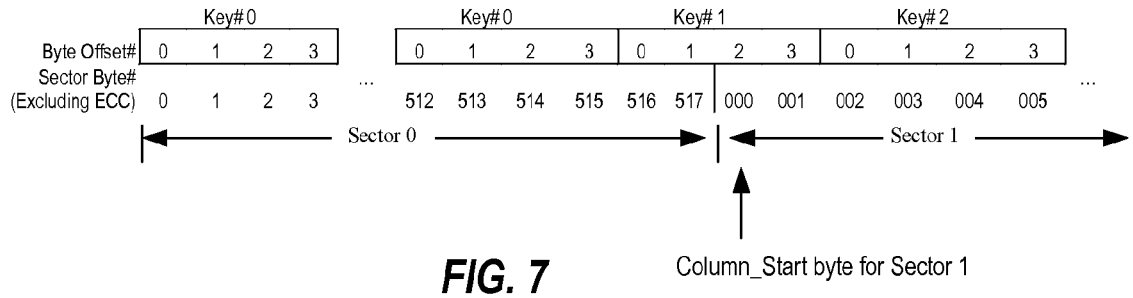

FIG. 7

Column_Start byte for Sector 1

Exemplary SKN Calculation

Corresponds to Fig. 7

| Page Offset | Sector No. | Sector Format Hdr | Sector Format User | Sector Size | Column Start | Column End | #Keys per Sector | Page Offset | D-Word Offset | SKN | Byte Offset |
|---|---|---|---|---|---|---|---|---|---|---|---|
| 0 | 0  | 6 | 512 | 518 | 0    | 0205 | 0      | 00 | 00 | 00 | 0 |
| 0 | 1  | 2 | 512 | 514 | 206  | 0407 | 129 2/4 | 00 | 01 | 01 | 2 |
| 0 | 2  | 2 | 512 | 514 | 408  | 0609 | 258    | 00 | 02 | 02 | 0 |
| 0 | 3  | 2 | 512 | 514 | 60A  | 080B | 386 2/4 | 00 | 02 | 02 | 2 |
| 0 | 4  | 2 | 512 | 514 | 80C  | 0A0D | 515    | 00 | 03 | 03 | 0 |
| 0 | 5  | 2 | 512 | 514 | A0E  | 0C0F | 643 2/4 | 00 | 03 | 03 | 2 |
| 0 | 6  | 2 | 512 | 514 | C10  | 0E11 | 772    | 00 | 04 | 04 | 0 |
| 0 | 7  | 2 | 512 | 514 | E12  | 1013 | 900 2/4 | 00 | 04 | 04 | 2 |
| 0 | 8  | 2 | 512 | 514 | 1014 | 1215 | 1029   | 00 | 05 | 05 | 0 |
| 0 | 9  | 2 | 512 | 514 | 1216 | 1417 | 1157 2/4 | 00 | 05 | 05 | 2 |
| 0 | 10 | 2 | 512 | 514 | 1418 | 1619 | 1286   | 00 | 06 | 06 | 0 |
| 0 | 11 | 2 | 512 | 514 | 161A | 181B | 1414 2/4 | 00 | 06 | 06 | 2 |
| 0 | 12 | 2 | 512 | 514 | 181C | 1A1D | 1543   | 00 | 07 | 07 | 0 |
| 0 | 13 | 2 | 512 | 514 | 1A1E | 1C1F | 1671 2/4 | 00 | 07 | 07 | 2 |
| 0 | 14 | 2 | 512 | 514 | 1C20 | 1E21 | 1800   | 00 | 08 | 08 | 0 |
| 0 | 15 | 2 | 512 | 514 | 1E22 | 2023 | 1928 2/4 | 00 | 08 | 08 | 2 |
| 1 | 0  | 6 | 512 | 518 | 0    | 0205 | 0      | 01 | 00 | 01 | 0 |
| 1 | 1  | 2 | 512 | 514 | 206  | 0407 | 129 2/4 | 01 | 02 | 02 | 2 |
| 1 | 2  | 2 | 512 | 514 | 408  | 0609 | 258    | 01 | 02 | 03 | 0 |
| 1 | 3  | 2 | 512 | 514 | 60A  | 080B | 386 2/4 | 01 | 02 | 03 | 2 |
| 1 | 4  | 2 | 512 | 514 | 80C  | 0A0D | 515    | 01 | 03 | 04 | 0 |
| 1 | 5  | 2 | 512 | 514 | A0E  | 0C0F | 643 2/4 | 01 | 03 | 04 | 2 |
| 1 | 6  | 2 | 512 | 514 | C10  | 0E11 | 772    | 01 | 04 | 05 | 0 |
| 1 | 7  | 2 | 512 | 514 | E12  | 1013 | 900 2/4 | 01 | 04 | 05 | 2 |
| 1 | 8  | 2 | 512 | 514 | 1014 | 1215 | 1029   | 01 | 05 | 06 | 0 |
| 1 | 9  | 2 | 512 | 514 | 1216 | 1417 | 1157 2/4 | 01 | 05 | 06 | 2 |
| 1 | 10 | 2 | 512 | 514 | 1418 | 1619 | 1286   | 01 | 06 | 07 | 0 |
| 1 | 11 | 2 | 512 | 514 | 161A | 181B | 1414 2/4 | 01 | 06 | 07 | 2 |
| 1 | 12 | 2 | 512 | 514 | 181C | 1A1D | 1543   | 01 | 07 | 08 | 0 |
| 1 | 13 | 2 | 512 | 514 | 1A1E | 1C1F | 1671 2/4 | 01 | 07 | 08 | 2 |
| 1 | 14 | 2 | 512 | 514 | 1C20 | 1E21 | 1800   | 01 | 08 | 09 | 0 |
| 1 | 15 | 2 | 512 | 514 | 1E22 | 2023 | 1928 2/4 | 01 | 08 | 09 | 2 |

FIG. 8

Exemplary "calculated" sequence of 8-bit keys

Byte Offset Number example with 32-bit keys and 2062-byte ECC pages

Key Size 4 bytes
No. Keys: 32 keys

D-Word Offset and Byte Offset Register Values for
Exemplary 2062-byte ECC Pages

| ECC Page No. [Dec] | ECC Page Format Hdr [Dec] | ECC Page Format User [Dec] | ECC Page Size [Dec] | Column Start [Hex] | Column End [Hex] | #Keys per ECC Page [Dec] | D-Word Offset [Dec] | Byte Offset [Dec] |
|---|---|---|---|---|---|---|---|---|
| 0 | 14 | 2048 | 2062 | 0 | 080D | 0 | 00 | 0 |
| 1 | 14 | 2048 | 2062 | 80E | 101B | 515 2/4 | 03 | 2 |
| 2 | 14 | 2048 | 2062 | 101C | 1829 | 1031 | 07 | 0 |
| 3 | 14 | 2048 | 2062 | 182A | 2037 | 1546 2/4 | 10 | 2 |

*FIG. 11*

SKN Register Values for Exemplary 2062-byte ECC Pages

| Page Offset No. | ECC Page 0 | ECC Page 1 | ECC Page 2 | ECC Page 3 |
|---|---|---|---|---|
| 0 | 0 | 6 | 28 | 23 |
| 1 | 1 | 0 | 18 | 6 |
| 2 | 2 | 1 | 17 | 4 |
| 3 | 3 | 7 | 27 | 21 |
| 4 | 4 | 6 | 3 | 30 |
| 5 | 5 | 14 | 15 | 14 |
| 6 | 6 | 24 | 28 | 1 |
| 7 | 7 | 17 | 17 | 17 |
| 8 | 8 | 9 | 31 | 19 |
| 9 | 9 | 12 | 8 | 31 |
| 10 | 10 | 25 | 25 | 20 |
| 11 | 11 | 8 | 12 | 9 |
| 12 | 12 | 23 | 31 | 0 |
| 13 | 13 | 8 | 20 | 23 |
| 14 | 14 | 27 | 11 | 17 |
| 15 | 15 | 31 | 20 | 29 |
| 16 | 16 | 6 | 30 | 12 |
| 17 | 17 | 21 | 17 | 0 |
| 18 | 18 | 18 | 18 | 4 |
| 19 | 19 | 9 | 13 | 2 |
| 20 | 20 | 0 | 9 | 0 |
| 21 | 21 | 24 | 5 | 31 |
| 22 | 22 | 18 | 2 | 0 |
| 23 | 23 | 14 | 2 | 2 |
| 24 | 24 | 8 | 31 | 3 |
| 25 | 25 | 1 | 16 | 8 |
| 26 | 26 | 29 | 9 | 0 |
| 27 | 27 | 30 | 13 | 6 |
| 28 | 28 | 12 | 1 | 27 |
| 29 | 29 | 12 | 4 | 7 |
| 30 | 30 | 14 | 10 | 16 |
| 31 | 31 | 14 | 12 | 16 |

*FIG. 12*

Exemplary Header Format, including 5-bit Page Offset Field
(e.g., for a single-sector ECC page)

| LBA | Data Structure ID | Page Offset | Application Byte |
|---|---|---|---|
| 4 Bytes | 6 Bits | 5 Bits | 5 Bits |

FIG. 13

Exemplary 2K Byte ECC Page Header Format, including 5-bit Page
Offset Field (e.g., for each of four Sectors in an ECC Page)

ECC Page Header Layout (14 Bytes)

| Sector 0 Header | Sector 1 Header | Sector 2 Header | Sector 3 Header | Page Header Data (LBA or Other Data) | Unused |
|---|---|---|---|---|---|
| 2 Bytes | 2 Bytes | 2 Bytes | 2 Bytes | 4 Bytes | 2 Bytes |

The Page Header Data field holds either the LBA or other parameters related to sector 0.

Sector Header Layout (2 Bytes)

| Page Offset | SD Application | Sector Id |
|---|---|---|
| 5 Bits | 5 Bits | 6 Bits |
| Bits 11-15 | Bits 6-10 | Bits 0-5 |

SKN Values
(showing the exemplary ECC Page crossing boundaries)

Exemplary memory cell states of unscrambled repeating 0xFF data
(showing first 16 bytes of each word line)

FIG. 19

Exemplary memory cell states of scrambled repeating 0xFF data
(showing first 16 bytes of each word line)

| WL | Byte 1 | Byte 2 | Byte 3 | Byte 4 | Byte 5 | Byte 6 | Byte 7 | Byte 8 | Byte 9 | Byte 10 | Byte 11 | Byte 12 | Byte 13 | Byte 14 | Byte 15 | Byte 16 |
|---|---|---|---|---|---|---|---|---|---|---|---|---|---|---|---|---|
| 00 | AABCCAAC | CCAEBACC | AABCCEAA | CAABACCE | ABCCAACA | CCBBACCA | CEAABCCA | CBECAABC | EAACCAAC | CBECAACC | EAABCCAA | BECAABCC | AACCAACB | BECAACCE | AABCCAAC | ECAABCCE |
| 01 | CAACCAEB | BACCAABC | CEAACCAE | ABCCAABC | AACCAEBC | AAAAABCC | BCCAACBC | AABCCEAA | CAACBECA | AACCEAAC | CCAACBEC | ABCCEAAB | AACBECAA | ACCEAACC | CAACBECA | BCCEAABC |
| 02 | CAEBACCE | AABCCAAC | CCAEBACC | AEEECBAE | AEBACCEC | AEACAACA | ACBECAAC | CEAABCCA | BECAABCC | EAACCAAC | CBECAACC | EAABCCAA | ECAABCCE | AACCAACB | BECAACCE | AABCCAAC |
| 03 | ACCEAABC | CAACCAEB | BACCAABC | BCABCCAE | CCEABCA | ACACAEBA | CAACCEAA | BCCAACBE | ABCCEAAB | CAACBECA | AACCEAAC | CCAACBEC | BCCEAABC | AACBECAA | ACCEAACC | CAACBECA |
| 04 | AABCCEAA | CAEBACCE | AABCCAAC | BECCBACC | ABCCAABC | ABEACCEA | CEAACCEA | ACBECAAC | EAABCCAA | BECAABCC | EAACCAAC | CBECAACC | AABCCAAC | ECAABCCE | AACCAACB | BECAACCE |
| 05 | CEAACCAE | ACCEAACC | CAACCAEB | EECEAABC | EAACCAEE | CABAABCC | CCAACBEC | CAAACCAA | CAACBEC | AACCEAAC | CAACBECA | AACCEAAB | CAACBECA | ACCEAACC | AACBECAA | ACCEAACC |
| 06 | CCAEBACC | AABCCEAA | CAEBACCE | CEEECAAC | CEBACCE | AEACCEA | CCAACBEC | ACBECAAC | ABCCEAAB | EAABCCAA | CAACBECA | AACCEAAB | BECAACCE | AABCCAAC | ECAABCCE | AACCAACB |
| 07 | BACCAABC | CEAACCAE | ACCEAABB | EBAECAEB | ACCAABCA | AABCCAAC | CEAABCCA | CAACCAAC | ACCEEAC | CCAACBEC | ABCCEAAB | CAACCAAC | ACCAACC | CAACCAACB | AACBECAA | ACCAACB |
| 08 | AABCCAAC | CCAEBACC | AABCCEEB | EBBAACCE | ABCCAABC | AEACAEBB | ECAABCA | CBECAABC | EAAACCAAC | CAACBECA | EAABCCAA | BECAACCE | ACCAAAB | AACBECAA | ACBECAA | AACBECAA |
| 09 | CAACCAEB | BACCAABC | CEAACCAE | ABCCAABC | AACCAEBC | AAAAABCC | BBECEAB | BEEABCBE | BACEEBBE | EAACBEEB | BBECAABC | EAABCBE | ACEEBBBE | AACBEEBB | BCCEABCE | EABCBEEB |
| 0a | BEECABBE | EABCCAEB | BBEEBABA | EAEACEAE | ECCABBEB | AEACAEBB | BBBECEAB | BEEABCBE | BACEEBBE | EAACBEEB | BBECAABC | EAABCBE | ACEEBBBE | AACBEEBB | BCCEABCE | EABCBEEB |
| 0b | ACCEAABC | CAACCAEB | BACCAABA | BCABCCAE | CCEAABCA | ACACAEBA | CAACCEAA | BCCAACBE | ABCCEAAB | CAACBECA | AACCEAAC | CCAACBEC | BCCEAABC | AACBECAA | ACCEAACC | CAACBECA |
| 0c | AABCCEAA | CAEBACCE | AABCCAAC | BECCBACC | ABCCAABC | ABEACCEA | CEAACCEA | ACBECAAC | EAABCCAA | BECAABCC | EAACCAAC | CBECAACC | AABCCAAC | ECAABCCE | AACCAACB | BECAACCE |
| 0d | CEAACCAE | ACCEAACC | CAACCAEB | EEECEAAC | EAACCAEE | CABAABCC | CCAACBEC | CEAACCAA | CAACBECA | EAABCCAA | CAACBECA | AACCEAAB | AACBECAA | AACBECAA | AACBECAA | ACCEAACC |
| 0e | CCAEBACC | AABCCEAA | CAEBACCB | CEEECAAC | CAEBACCC | AEACEAAC | CBECAABC | AEBCCAAC | EAABCCAA | CBECAACC | EAACCAAC | EAABCCAA | BECAABCC | EAABCCAA | ECAABCCE | AACCAACB |
| 0f | BACCAABC | CEAACCAE | ACCEAACE | EBAAACCE | ACCAABCA | ECCCCAEB | CEAABCCA | CEAACCAAC | CAACBECA | CBECAACC | ABCCEAAB | CAACBECA | ACCEAACC | CAACBECA | BCCEAABC | AACBECAA |
| 10 | AABCCAAC | CEAABCC | AABCCEEB | EBBAACCE | ABCCEAAA | CCBBACCA | AABCCEAA | AABCCEAA | EAACCAAC | CBECAACC | EAABCCAA | BECAABCC | AACCAACB | BECAACCE | AABCCAAC | ECAABCCE |
| 11 | CAACCAEB | BACCAABC | CEAACCCE | ABCCAABC | AACCAEBC | AAAAABCC | BCCAACBC | ACBECAAC | CAACBECA | AACCEAAC | CCAACBEC | ABCCEAAB | AACBECAA | ACCEAACC | CAACBECA | BCCEAABC |
| 12 | CAEBACCE | AABCCAAC | CCAEBAAC | AEEECBAE | AEBACCEC | AEACAACA | CAACCEAA | CEAABCCE | BECAABCC | EAACCAAC | CBECAACC | EAABCCAA | ECAABCCE | AACCAACB | BECAACCE | AABCCAAC |
| 13 | ACCEAABC | CAACCAEB | BACCAAEC | BCABCCAE | CCEABCA | ACACAEBA | ACBECAAC | CAACCAAC | ABCCEAAB | CAACBECA | AACCEAAC | CCAACBEC | BCCEAABC | AACBECAA | ACCEAACC | CAACBECA |
| 14 | AABCCEAA | CAEBACCE | AABCCEAB | BECCBACC | ABCCAABC | ABEACCEA | CEAACCAA | ACBECAAC | EAABCCAA | EAACCAAC | CBECAACC | EAABCCAA | BECAACCE | AABCCAAC | AACBECAA | BECAACCE |
| 15 | CEAACCAE | ACCEAACC | CAACCABB | EECEAABC | CEEABCE | CABAABCC | ACCEAAC | CAACCAACC | CCEEAC | CCAACBEC | CAACBECA | AACCEAAB | AACBECAA | AACBECAA | ACBECAAC | BECAABCC |
| 16 | CCAEBACC | AABCCEAA | CAEBACAE | CEEECAAC | CEBACCE | AEACEAAC | AABCCEAA | CEAACCAA | EAABCCAA | CBECAACC | EAABCCAA | ABCCEAAB | AABCCEAA | AABCCEAA | ECAABCCE | AABCCEAA |
| 17 | BACCAABC | CEAACCAE | ACCEAAEB | EBBAACCE | ACCAABCA | ECCCCAEB | CEAABCCA | CEAACCAA | CAACBECA | ABCCEAAB | CEAACCAA | CAACBECA | ACCEAACC | CAACBECA | BCCEAABC | AACBECAA |
| 18 | AABCCEAA | CEAABACC | CEAABAEB | EBBAACCE | ABCCAACA | CCBBACCA | AABCCEAA | AABCCEAA | EAACCAAC | CBECAACC | EAABCCAA | BECAABCC | AACCAACB | BECAACCE | AABCCEAA | ECAABCCE |
| 19 | CAACCAEB | BACCAABC | CEAACCCB | ABCCAABC | AACCAEBC | AAAAABCC | BCCAACBC | AABCCEAA | CAACBECA | AACCEAAC | CCAACBEC | ABCCEAAB | AACBECAA | ACCEAACC | CAACBECA | BCCEAABC |
| 1a | CAEBACCE | AABCCAAC | CCAEBAAA | AEEECEAA | AEBACCEC | AEACAACA | ACBECAAC | CEAABCCA | EAABCCAA | BECAABCC | EAACCAAC | CBECAACC | AABCCAAC | ECAABCCE | AACCAACB | BECAACCE |
| 1b | ACCEAABC | CAACCAEB | BACCAAEA | AEFECAAE | CCEABCA | ACACAEBA | CEAACCAA | ACBECAAC | CAACBECA | AACCEAAC | CCAACBEC | BCCEAABC | BCCEAABC | AACBECAA | ACCEAACC | CAACBECA |
| 1c | AABCCEAA | CAEBACCE | AABCCACA | BCABCBACC | CCEABCA | CABAABCC | CEAACCAA | BCCAACBE | EAABCCAA | BECAABCC | EAACCAAC | CBECAACC | EAABCCAA | BCCEAABC | AACBECAA | BECAACCE |
| 1d | CEAACCAE | ACCEAACC | CAACCABE | EECEEAC | EAACCAEE | ABEACCEA | CEBACCAA | ACBECAAC | EAABCCAA | BECAABCC | EAAABCC | CBECAACC | AABCCAAC | ECAABCCE | AACBCAACB | BECAACCE |
| 1e | CCAEBACC | AABCCEAA | CAEBACAE | CEEEEAC | CAEBACCC | AEACEAAC | CBECAABC | CEAABCCE | EAABCCAA | CBECAACC | ABCCEAAB | EAABCCAA | BECAACCE | AABCCEAA | ECAABCCE | AACCAACB |
| 1f | BACCAABC | CEAACCAE | ACCEAAEA | ACEACAEB | ACCEABCA | ECCCCAEB | AABCCEAA | CCAACCAA | AACCEAAC | ABCCEAAB | ABCCEEAB | CAACBECA | ACCEAACC | CAACBECA | BCCEAABC | AACBECAA |

*FIG. 20*

SYSTEM, METHOD AND MEMORY DEVICE PROVIDING DATA SCRAMBLING COMPATIBLE WITH ON-CHIP COPY OPERATION

CROSS-REFERENCE TO RELATED APPLICATION(S)

This application claims the benefit under 35 U.S.C. §119(e) of U.S. Provisional Application No. 61/018,096 filed on Dec. 31, 2007 and entitled "System, Apparatus, and Method for Memory Device Data Scrambling Usable with On-Chip Copy Operation" by Jason T. Lin, Steven S. Cheng, and Shai Traister, which application is incorporated herein by reference in its entirety.

BACKGROUND

The present invention relates generally to flash memory storage systems, and more specifically to such a system in which data to be written to the flash memory is scrambled to help reduce certain data pattern-dependent sensitivities and disturbance effects.

A "flash file system" provides a system of data storage and manipulation on a flash memory device that allows the device to emulate a magnetic disk. A flash file system enables applications or operating systems to interact with a flash memory device not using physical addresses but rather using logical addresses (sometimes called virtual addresses). An intermediate software layer between the software application and the physical memory system provides a mapping between logical addresses and physical addresses. Some systems that implement logical-to-physical address mapping are described in U.S. Pat. No. 5,404,485 to Ban, in U.S. Pat. No. 5,937,425 to Ban, and in U.S. Pat. No. 6,591,330 to Lasser, all three of which patents are incorporated herein by reference in their entirety.

NAND flash memories are inherently susceptible to specific data patterns. For example, programming many cells on the same bit line to the same data state, or many cells on the same word line to the same data state, may cause program disturb effects which may alter the cell charge distribution and shift one or more cells to a different data state. Such fixed repetitive data patterns are not uncommon in bit patterns frequently written to flash memories, particularly those written to certain blocks, such as control blocks, within a flash file system. Such control blocks are used by the file system, for example, to keep track of logical-to-physical address mapping information, and other information about the various data blocks. At times, programming even a few word lines to specific data states may also cause such disturb effects. These disturb effects, as well as others, are particularly problematic in memory arrays storing multiple bits per cell (i.e., MBC arrays), also known as "multiple level cell" (MLC) arrays, and these effects can cause one or more cells to generate a read error as a function of specific user data patterns. Certain program disturb effects are described in U.S. Pat. No. 7,023,739 to Chen, et al., (the '739 patent), the disclosure of which is incorporated herein by reference in its entirety.

To address this issue, techniques have been devised using system level data scrambling or randomization to eliminate the particularly problematic data patterns in the user data and control blocks before programming into a flash device. In this context, the act of scrambling or randomizing data refers to breaking up the bit patterns associated with the memory cell states along memory bit-lines and word-lines. However, such data scrambling techniques implemented outside the NAND memory are incompatible with the use of Flash Memory On-Chip-Copy or Copy-Back operations, and cannot achieve the system performance that would otherwise be attainable. Such an on-chip-copy operates on chunks of data to autonomously relocate data from one physical memory location to another physical memory location. This provides higher performance and requires less power consumption than is achievable without using on-chip copy operation, in which data is read from the device and communicated off-chip to a companion device (e.g., a flash controller device), then re-written into a different physical location of the NAND memory. However, an on-chip copy operation performed on data that is scrambled based on a physical memory address will unintentionally associate the scrambled data with a new key/seed, and results in the inability to properly descramble the data using the incorrect new key/seed to retrieve the original intended data.

SUMMARY

The present invention provides for data scrambling techniques implemented externally to a flash memory device which can be used in concert with flash memory on-chip copy functionality operating internally to the flash device, thus supporting high performance copying operations. Many modern flash memory sub-systems implement "flash file systems" which frequently utilize garbage collection techniques, and can benefit greatly from such on-chip copy functionality. In addition, the techniques may be implemented to provide, for example, a hardware based solution which has little or no impact on overall system performance, and which may be implemented at very low incremental cost, to provide a cost-effective solution for increasing overall system reliability.

The data scrambling technique preferably uses a logical address, such as a logical page address, rather than a physical page address, to determine a seed scrambling key. The logical page address is determined from the logical block address of the data, and thus does not restrict the physical placement of the scrambled data in memory. As a result, on-chip copy operations may be used. Since the logical page address of the data remains unchanged even if the data is relocated by an on-chip copy operation, the same seed scrambling key may be used to descramble the data. This seed scrambling key is used to scramble the user data in a particular portion of the block, but as additional data is written across a single word line, and as additional data is written along bit lines, the scrambling key is deterministically varied to generally "randomize" the data states.

The invention also provides for robust file system operation, including the capability to tolerate a power loss at any time, and be able to re-initialize a flash memory and reconstruct the mapping of the various blocks stored therewithin, to properly descramble and read back data in order to identify data types and data relocations due to on-chip-copy operations. All the data stored in the flash may be scrambled, including headers and control structures. The scrambling key information may be stored in the page headers to enable extraction of the scrambling key itself, from the scrambled data, during initialization. In some embodiments, different scrambling methods are used to scramble information in control structures to support initialization and debug processes.

In certain embodiments, the data scrambling can be done effectively by hardware, firmware, or software using a simplistic method involving XOR logic and a deterministic number of Scrambling Keys by bitwise rotating a predetermined initial Scrambling Key Seed, thereby creating a sequence of revolving scrambling keys, each with an assigned key number. The scrambling keys (i.e., "scrambler" keys) can be deduced for any logical group of data with knowledge of the first scrambling key number used in the logical group, which may be referred to as the Starting Key Number (SKN).

SKN's can be associated with the logical group memory address and used for scrambling data. The SKN itself, as well as other header (or overhead) information, can be scrambled in the same method as user data bits. In some embodiments, the Flash Controller Firmware (FW) or System Host Software need only set the SKN at the beginning of each memory transaction. Within the transaction, the scrambler may be configured to automatically generate subsequent Scrambling Keys as additional groups of data are written or read.

ECC encoding can be applied to the scrambled SKN bits separately or applied together with the associated scrambled user data bits. ECC encoded scrambled SKN bits and ECC encoded scrambled user data bits may be then stored in the Flash Memory. ECC generation/correction can be done either before or after scrambling/descrambling. The ECC parity bytes may or may not be scrambled, even though the header and data portions are scrambled.

In some embodiments, the Flash Controller Firmware or System Host Software having prior knowledge of Scrambler Key generation mechanism and data scrambling method can: (a) mimic the Data Scrambler operations; (b) efficiently build a table (e.g., 32 entries) forward mapping desired scrambled SKN's to logical addresses (e.g., using the default seed); and (c) efficiently build a table with reverse mapping of logical addresses to desired scrambled SKN's.

During system initialization, an exemplary system may perform the following to identify the data types and logical grouping locations stored in Flash Memory: (a) Flash Controller Firmware (FW) or System Host Software generates the forward and reverse mapping tables for the desired scrambled SKN's; (b) with the Hardware Scrambler disabled, the first sector of each memory block is scanned to extract the first scrambled SKN stored in that memory block (e.g., within the first several bytes of each sector); (c) using the extracted scrambled SKN, the Flash Controller Firmware or System Host Software looks up the reverse mapping table to determine the unscrambled SKN; (d) with the Hardware Scrambler enabled, the first sector is read again but descrambled using the unscrambled SKN as the key (alternatively, the FW may use the SKN and perform the descrambling of the header without reading the data again); and (e) the memory block type is identified and stored in the Flash Controller RAM.

After system initialization, the Flash Controller Firmware or System Host Software may control the assignment of physical memory locations for storing logical groups of data, use the logical group address as the scrambling and descrambling key/seed, and use the forward mapping table of desired scrambled SKN's to store the scrambled SKN associated with the logical group in the Flash Memory. The Flash Controller Firmware or System Host Software may perform memory read operations using the logical group addresses as the key/seed for descrambling the user data bits. Logical sector data may be physically relocated on the Flash Memory by on-chip-copy operation(s) at any time. The controller is aware when an on-chip copy is performed, and can re-map the data accordingly.

In one aspect the invention provides a method for storing information in a non-volatile memory which, in an exemplary embodiment, includes determining a starting key based upon a seed key and a logical page address associated with a group of data; randomizing the group of data using a deterministic sequence of keys corresponding to the starting key; and storing the randomized group of data into a physical page of the non-volatile memory.

In another aspect the invention provides a method for storing information in a non-volatile memory which, in an exemplary embodiment, includes determining a page offset number using a logical block address of a memory page; determining a starting key based upon a seed key and the page offset number; scrambling page data using a deterministic sequence of scrambling keys corresponding to the starting key; storing into a header of a physical page of the non-volatile memory an identifier corresponding to the page offset number; and storing the scrambled page data into the physical page.

In another aspect the invention provides an apparatus which, in an exemplary embodiment, includes a non-volatile memory, and a memory controller configured to determine a starting key based upon a seed key and a logical page address associated with a group of data; randomize the group of data using a deterministic sequence of keys corresponding to the starting key; and store the randomized group of data into a physical page of the non-volatile memory.

The methods of the present invention may be implemented by software, by hardware, or by a combination of both. Such software may be software executed on a host computer which reads and writes the data (e.g., within a software device driver supporting the storage device), or may be firmware executed within a memory controller that interacts with the host computer and controls the memory media. Such hardware may be implemented either within the memory controller or within the memory media, irrespective of whether the memory controller and the memory media reside on two separate dies or reside on a common die. All of the above configurations and variations are within the scope of this invention.

The foregoing summary is intended to help introduce the invention, and should not be viewed as limiting, as the invention is defined by the claims. Moreover, the inventive concepts and embodiments described herein are specifically contemplated to be used alone as well as in various combinations. Accordingly, other embodiments, variations, and improvements not described herein are not necessarily excluded from the scope of the invention.

BRIEF DESCRIPTION OF THE DRAWINGS

The present invention may be better understood, and its numerous objects, features, and advantages made apparent to those skilled in the art by referencing the accompanying drawings.

FIG. 1, labeled prior art, is a schematic diagram of a NAND memory array.

FIGS. 2A, 2B, and 2C are diagrams depicting various programmed memory states in a single-bit-per-cell memory, and in a multiple-bit-per-cell memory.

FIGS. 3A and 3B depict conceptually a scrambler block and a descrambler block in accordance with the present invention.

FIG. 4 is a diagram of an exemplary sequence of 8-bit scrambling keys.

FIG. 5 is a table depicting an exemplary sequence of 32-bit scrambling keys.

FIG. 7 is a diagram illustrating a sector boundary falling in the middle of a scrambling key.

FIG. 8 is a table illustrating exemplary values of several scrambling parameters relevant to each of 16 sectors within a physical page.

FIG. 11 is a table illustrating exemplary values of several scrambling parameters relevant to each of 4 ECC pages within a physical page.

FIG. 12 is a table illustrating exemplary SKN values for each of 4 ECC pages within a physical page, and for each of 32 physical pages.

FIG. 13 is a diagram depicting an exemplary header format for a single-sector ECC page.

FIG. 14 is a diagram depicting another exemplary header format for a 2K Byte ECC page.

FIG. 15 is an exemplary page mapping table in accordance with some embodiments of the present invention.

FIG. 16 is an exemplary SKN table in accordance with some embodiments of the present invention.

FIG. 19 is a table depicting memory cell states of unscrambled repeating 0xFF data patterns.

FIG. 20 is a table depicting memory cell states of scrambled data corresponding to that shown in FIG. 19, after scrambling in accordance with certain embodiments of the present invention.

The use of the same reference symbols in different drawings indicates similar or identical items.

DESCRIPTION OF THE PREFERRED EMBODIMENT(S)

Figure 6:
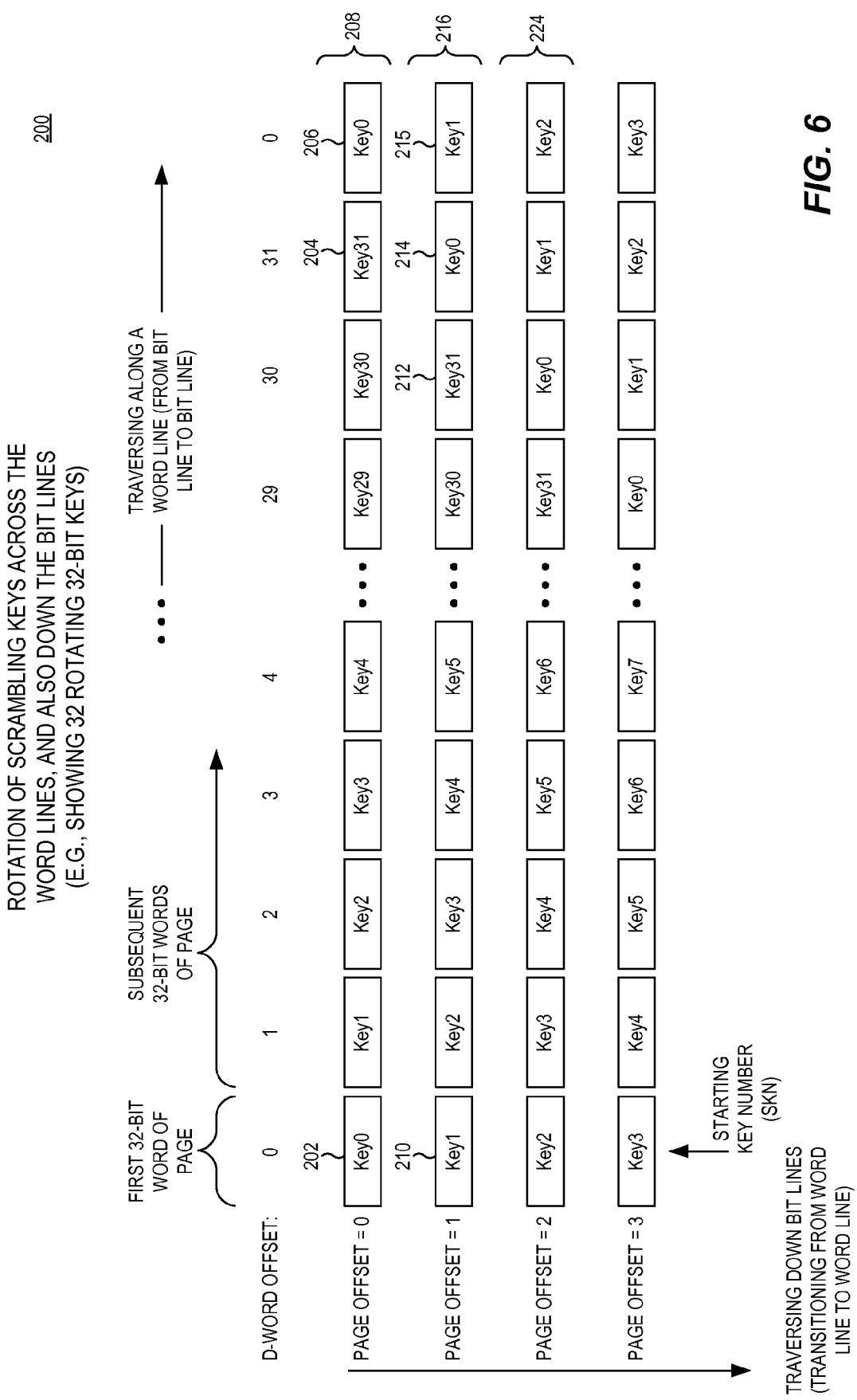
FIG. 6 is a diagram depicting the use of different scrambling keys for different words of a page, and for different pages.

Referring now to FIG. 1, a schematic diagram is shown representing a portion of a typical NAND memory array 100. The portion shown may represent a two-dimensional array having only one plane of memory cells, or may represent one level of three-dimensional memory array having more than one plane of memory cells stacked on top of each other. The exemplary NAND string 102 includes thirty-two memory cell transistors connected in series, each gated by a respective one of a plurality of thirty-two word lines 111 (individually labeled WL0, WL1, ..., WL30, WL31). The NAND string 102 also includes a block select device 114 for coupling one end of the NAND string to a bit line 103 in accordance with a block select signal BS0 conveyed on node 113, and further includes a second block select device 116 for coupling the other end of the NAND string to a shared bias node 101 in accordance with a block select signal BS1 conveyed on node 115.

Each NAND string 102, 104, 106 is disposed within the same block 124 within the memory array, and each is respectively coupled to its associated bit line 103, 105, 107. The memory cells in the NAND strings (i.e., those gated by one of the word lines) typically incorporate a floating gate structure, or may incorporate a charge storage dielectric layer between the gate and the underlying channel, so that the threshold voltage of the memory cell device may be altered by programming and erasure. The various block select devices (e.g., 114, 116) are typically normal MOS devices (i.e., non-programmable), but in certain memory technologies may be fabricated identically to the memory cell devices. While this exemplary NAND array 100 shows thirty-two word lines in a NAND block, other numbers of word lines per block are possible, such as 16, 64, 88, or any other value, although a number equal to an integral power of two is typically implemented.

Thus, a typical NAND memory cell array may be generalized as having a memory cell represented by the intersection of each bit-line and word-line. Traditionally, each memory cell stores one bit of information, which is accomplished by supporting two states of the memory cell. One state represents a logical "0" and the other state represents a logical "1". Frequently, the two states may be implemented by having a floating gate situated above the cell's channel (the area connecting the source and drain elements of the cell's transistor), and having two valid states for the amount of charge stored within the floating gate. Typically, one state is with zero charge in the floating gate and is the initial unwritten state of the cell after being erased (commonly defined to represent the "1" state) and another state is with some amount of negative charge in the floating gate (commonly defined to represent the "0" state). Having negative charge in the gate causes the threshold voltage of the cell's transistor (i.e. the voltage that has to be applied to the transistor's control gate in order to cause the transistor to conduct) to increase. It is then possible to read the stored bit by checking the threshold voltage of the cell—if the threshold voltage is in the higher state then the bit value is "0" and if the threshold voltage is in the lower state then the bit value is "1". Actually there is no need to accurately read the cell's threshold voltage—all that is needed is to correctly identify in which of the two states the cell is currently located. For that purpose it is enough to make a comparison against a reference voltage value that is in the middle between the two states, and thus to determine if the cell's threshold voltage is below or above this reference value.

FIG. 2A shows graphically how this works. Specifically, FIG. 2A shows the distribution of the threshold voltages of a large population of cells. Because the cells in a flash device are not exactly identical in their characteristics and behavior (due, for example, to small variations in impurities concentrations or to defects in the silicon structure), applying the same programming operation to all the cells does not cause all of the cells to have exactly the same threshold voltage. (Note that, for historical reasons, writing data to a flash memory is commonly referred to as "programming" the flash memory.) Instead, the threshold voltage is distributed. Cells storing a value of "1" typically have a negative threshold voltage, such that most of the cells have a threshold voltage close to the value shown by the left peak 120, with some smaller numbers of cells having lower or higher threshold voltages. Similarly, cells storing a value of "0" typically have a positive threshold voltage, such that most of the cells have a threshold voltage close to the value shown by the right peak 122, with some smaller numbers of cells having lower or higher threshold voltages.

It is increasingly common for memory cells to store more than 1 bit of information, using a technique conventionally called "Multi Level Cells" or MLC for short. However, this nomenclature is misleading, because the previous type of flash cells also has more than one level: they have two levels, as described above. Therefore, the two kinds of flash cells are referred to herein as "Single Bit Cells" (SBC) and "Multi-Bit Cells" (MBC). The improvement brought by the MBC flash is the storing of two (or more) bits in each cell. In order to simplify the explanations, the two-bit case is emphasized herein. It should however be understood the present invention is equally applicable to flash memory devices that support any number of bits per cell. In order for a single memory cell to store two bits of information, the memory cell must be able to be programmed in one of four different states. As the cell's "state" is represented by its threshold voltage, it is clear an MBC cell should support four different valid ranges for its threshold voltage. FIG. 2B shows an exemplary threshold voltage distribution for a typical MBC cell. As expected, FIG. 2B has four peaks 130, 132, 134, 136, each corresponding to one state. As for the SBC case, each state is actually a range and not a single number. When reading the cell's contents, all that must be guaranteed is that the range that the cell's threshold voltage falls within is correctly identified. An example of an MBC flash device is described in U.S. Pat. No. 5,434,825 to Harari, the disclosure of which is incorporated herein by reference in its entirety.

When encoding two bits in an MBC cell by the four states, it is common to have the left-most state, peak 130, (typically having a negative threshold voltage) represent the case of both bits having a value of "1". In the discussion below, the following notation is used—the two bits of a cell are called the "lower bit" and the "upper bit". An explicit value of the bits is written in the form ["upper bit" "lower bit"], with the lower bit value on the right. So the case of the lower bit being "0" and the upper bit being "1" is written as "10". It should be understood that the selection of this terminology and notation is arbitrary, and other names and encodings are possible. Using this notation, the left-most state represents the case of "11". The other three states are typically assigned by the following order from left to right—"10", "00", "01". An example of MBC NAND flash device using such encoding is described in U.S. Pat. No. 6,522,580 to Chen, the disclosure of which is incorporated herein by reference in its entirety. See in particular FIG. 8 of the Chen patent. The four such states may be referred to simply as E, A, B, and C. It should be noted though that there is nothing limiting about this assignment of the states, and that any other ordering can be used. When reading an MBC cell's content, the range that the cell's threshold voltage falls within must be identified correctly; but in this case this cannot be achieved by comparing to one reference voltage, and several comparisons may be necessary.

Another state assignment is depicted in FIG. 2C, which may be referred to as LM Mode. In this mode, there are four peaks 140, 142, 144, 146 (in order from left to right) corresponding respectively to memory states "11", "01", "00", "10". These four states may again be referred to simply as E, A, B, and C. The lower page is typically programmed first, and if a "0" is to be programmed, results in an intermediate LM state, labeled as peak 148. When the upper page is to be programmed, if the upper bit is a "0", either the E state 140 is programmed to the A state 142, or the LM state 148 is programmed to the B state 144. If the upper bit is a "1", then the LM state 148 is programmed to the C state 146.

This LM Mode provides several advantages over the Conventional mode. First, there may be less programming stress since the programming time in the LM mode may be less than in the conventional mode (e.g., programming a memory cell in the conventional mode from the E state 130 to the C state 136 requires a long time to shift the threshold voltage of the memory cell, and stresses neighboring cells the entire time, whereas each of the threshold shifts in the LM mode are smaller in magnitude), and therefore less program disturb, and greater reliability. In addition, if using only the lower page, the separation between the E state 140 and the intermediate LM state 148 is larger than the separation between the E state 130 and A state 132 in the conventional mode, thereby resulting in greater signal margins in the memory cell. Lastly, the width of peak 148 can be wider than the width of peak 132 in the conventional mode, which allows lower page programming to occur more quickly since the resulting final threshold value need not be controlled as exactingly as in the conventional mode.

MBC devices provide a great advantage of cost—using a similarly sized cell an MBC device stores two bits rather than one. However, there may also some drawbacks to using MBC flash—the average read and write times of MBC memories are longer than of SBC memories, resulting in lower performance. Also, the reliability of MBC is lower than SBC. This can easily be understood—the differences between the threshold voltage ranges in MBC are much smaller than in SBC. Thus, a disturbance in the threshold voltage (e.g. leaking of the stored charge causing a threshold voltage drift, interference from operations on neighboring cells, etc.) that may have gone unnoticed in SBC because of the large gap between the two states, might cause an MBC cell to move from one state to another, resulting in an erroneous bit. The end result is a lower quality specification of MBC cells in terms of data retention time or the endurance of the device to many write/erase cycles. Thus there may be advantages to using both MBC cells and SBC cells, depending on the application's requirements.

While the above explanations deal with floating-gate flash memory cells, there are other types of flash memory technologies. For example, in the NROM flash memory technology there is no conductive floating gate but an insulating layer trapping the electric charge. The present invention is equally applicable for all flash memory types, even though the explanations are given in the context of floating-gate technology.

Program Disturb

There are several sources of errors in flash memory devices. One specific source of error is typically called "Program Disturb" or "PD" for short. The PD effect causes cells that are not intended to be written, to unintentionally move from their initial left-most state to some other state. (The explanations herein assume the common practice, also used in FIGS. 2A, 2B, and 2C, of drawing the threshold voltage axis such that its left direction represents lower values. This is an arbitrary practice and should not be construed to limit the scope of the invention in any way). Referring to the two-bit-per-cell example of FIG. 2C, cells that are in the leftmost state corresponding to bit values of "11" (or in other words, to the cell's erased state) and which are supposed to remain in such state, are found to be in the next-to-leftmost state of "10", resulting in one bit out of the two bits stored in the cell to be incorrect. In some cases, especially in cells storing more than two bits per cell and having more than four states, PD effects might turn out not only as a move from the leftmost state to its immediately adjacent state, but also as a move from the leftmost state to more distant states, and also as a move from a state that is not the leftmost state to another state to its right (i.e. having a higher threshold voltage). However, the case described first above of moving from the leftmost state to its immediately adjacent neighboring state is the most common, and will be used herein for all examples and explanations without limiting the generality of the methods of the present invention.

The reason for the PD effect is easy to understand when reviewing the voltages applied to the cells of a NAND flash device when programming a page. When programming a page of cells, a relatively high voltage is applied to the word line connected to the control gates of the cells of the page. What decides whether a certain cell threshold voltage is increased as a result of this control gate voltage is the voltage applied to the bit line connected to that cell. Cells that are not to be written with data have their bit line connected to a relatively high voltage level that minimizes the voltage difference across the cell. Cells that are to be written have their bit line connected to low voltage, causing a large voltage difference across the cell, and resulting in the cell's threshold voltage getting increased, thus moving the cell to the right on the voltage axis of FIG. 2C and causing the cell's state to change.

However, even though cells that are not meant to be written have a lower voltage difference across them than cells that are meant to be written, they still have some voltage difference across them. To reduce the voltage across these non-programmed cells even more, their channels may be "boosted" to a voltage closer in magnitude to the programming voltage applied to the selected word line, and thereby reduce the voltage difference across such memory cell devices. This is done by biasing other non-selected word lines in the memory block to an intermediate voltage closer to the "relatively high" bit line voltage corresponding to the cells that are not meant to be written. This biases the channel of these cells to a higher voltage, which is boosted to an even higher voltage when the selected word line is pulsed to a high programming voltage. However, since the charge trapped in the programmed cells along the selected word line partially negates the voltage applied to those non-selected word lines, and the overall boosting depends on the data (i.e., memory state) programmed to previous cells along the same bit line. For example, cells programmed to the "C" state (i.e., maximum charge stored in the memory cell) have the highest threshold voltage of such memory cell devices. If other cells along the bit line were previously programmed to the "C" state, this reduces the boosted voltage that is achieved, thus increasing the voltage across the memory device that is not to be written, and which causes unintentional programming.

In addition, if the page to be written has some cells that are written to high threshold voltages (for example, to the rightmost state), then the voltage difference across non-programmed cells gets higher. This is because all control gates of all cells of the page get the same voltage applied to them, and the higher the threshold voltage to be reached, the higher is that voltage. Therefore the need to apply higher control gate (i.e. word line) voltage to some cells, results in higher voltage difference at the non-programmed cells. Even though the cells are designed with the goal of not being effected by such anticipated voltage difference, in actual NAND flash devices such voltage differences stress the cells and might result in some of them changing their state even though this was neither intended nor desired.

To summarize the above explanation, PD is an effect in which when programming a page of cells, some cells that are intended to remain in their present memory state end up in another state, resulting in bit errors when reading those cells. Unfortunately, typical real-life user data is not random. Measurements on real-life user files show that the various possible states of the cells do not have equal probability to occur. As the leftmost state of the cells is the default value of cells not being written to, this state is the most frequent. This is easy to understand—a section of memory not initialized or not used within a file, very often corresponds to cells in the erased state.

As a result, in real-life applications the problem of PD errors is more severe than what is expected based on random data patterns statistical calculations. Relatively many cells will be in the erased state that is the most vulnerable state to PD errors, and therefore more PD errors than are predicted by random data distribution models will actually occur. The present invention deals with reducing the number of errors due to PD effects by manipulating the user data and randomizing the actual sequences of voltage levels or states programmed into the flash.

NAND Flash Concepts Introduction

To better understand the remaining description, several concepts and structures of an exemplary NAND flash memory device and flash file system are now introduced.

A block is the smallest chunk of a NAND flash memory that can be erased as a single unit. In reference to FIG. 1, the block includes the memory cells associated with the word lines selectable by a pair of block select transistors (i.e., the word lines between the corresponding block select lines), and the bit lines whose memory cells are coupled to these same physical word lines. A physical page is the smallest chunk of a NAND flash memory that can be written (i.e., programmed) as a single unit. In reference to FIG. 1, a physical page may include all memory cells along a single word line, and more than one physical page may correspond to the memory cells of a single word line. For example, in an MBC memory, a single word line may include a lower page and an upper page, and may further include lower and upper pages corresponding to even bit lines, and lower and upper pages corresponding to odd bit lines, for a total of four physical pages for each physical word line. A meta-page is one or more physical pages that are linked together to form a larger page. All physical pages within the meta-page are read/written in parallel to achieve higher performance.

An ECC page includes one or more sectors protected by a single cluster of ECC redundancy bytes. For example, in a single-sector ECC page, each sector is protected by its own ECC redundancy bytes, whereas in an ECC page having four 512-byte sectors, each 2KB of data information is protected by a single cluster of ECC redundancy bytes. Each ECC page may include a header of several bytes (e.g., 2, 6, 14, or some other number of bytes), in addition to the data.

The logical address space (e.g., of the host) is divided into equal sized logical groups of sectors. Each logical group contains exactly the number of sectors that will fit in a meta-block. A meta-block is a physical group of sectors that is erasable as a unit, and can be used to store a logical group of data. Two sector types are both stored in meta-blocks: data sectors for storing host data, and control sectors for storing firmware data. Control sectors are typically not accessed by the host. At a given time, a given meta-page typically contains only data or control sectors (e.g., except for scratch pad blocks, which may contain both types).

A logical to physical address translation is performed to relate a host's logical address to a corresponding physical address in flash memory. The lowest logical sector address (i.e., LBA) of the logical group does not need to be the first sector of the meta-block to which it is mapped. In other words, there may be an offset between the lowest address of a logical group and the lowest address of the meta-block to which it is mapped. A page tag is used to identify any offset, such as identifying the starting logical sector address of the data stored in the first physical sector of the meta-block.

The memory management system allows for update of a logical group of data by allocating a meta-block dedicated to recording the update data of the logical group. When the host starts to write data in a logical group, an update block is opened. The update meta-block records update data in the order received and has no restriction on whether the recording is in the correct logical order as originally stored (sequential) or not (non-sequential). Initially, such an update block is opened as a sequential update block, but if any of the writes are non-sequential, the block is converted to a non-sequential (i.e., "chaotic") update block. Eventually the update meta-block is closed to further recording. One of several processes will take place, but will ultimately end up with a fully filled meta-block in the correct order which replaces the original meta-block. In the chaotic case, directory data is maintained in the non-volatile memory in a manner that is conducive to frequent updates.

Data of a complete logical group of sectors is preferably stored in logically sequential order in a single meta-block. In this way, the index to the stored logical sectors is predefined. When the meta-block has in store all the sectors of a given logical group in a predefined order it is said to be "intact." As for an update block, when it eventually fills up with update data in logically sequential order, then the update block will become an updated intact meta-block that can readily replace the original meta-block. On the other hand, if the update block fills up with update data in a logically different order from that of the intact block, the update block is a non-sequential (i.e., "chaotic") update block and the out-of-order segments must be further processed so that eventually the update data of the logical group is stored in the same order as that of the intact block. In the preferred case, it is in logically sequential order in a single meta-block. The further processing involves consolidating the updated sectors in the update block with unchanged sectors in the original block into yet another update meta-block. The consolidated update block will then be in logically sequential order and can be used to replace the original block. Under some predetermined condition, the consolidation process is preceded by one or more compaction processes. The compaction process simply re-records the sectors of the chaotic update block into a replacing chaotic update block while eliminating any duplicate logical sector that has been rendered obsolete by a subsequent update of the same logical sector.

Mappings between logical groups and physical groups (meta-blocks) are stored in a set of tables and lists distributed among the non-volatile flash memory and RAM within a flash controller. An address table is maintained in flash memory, containing a meta-block address for every logical group in the memory system. In addition, logical to physical address records for recently written sectors are temporarily held in RAM. These volatile records can be reconstructed from block lists and data sector headers in flash memory when the system is initialized after power-up. The hierarchy of address records for logical groups includes the open update block list, the closed update block list in RAM and the group address table (GAT) maintained in flash memory.

An open update block list is a list in controller RAM of data update blocks which are currently open for writing updated host sector data. The entry for a block is moved to the closed update block list when the block is closed. The closed update block list is a list in controller RAM of data update blocks which have been closed. A subset of the entries in the list is moved to a sector in the Group Address Table during a control write operation.

The Group Address Table (GAT) is a list of meta-block addresses for all logical groups of host data in the memory system. The GAT contains one entry for each logical group, ordered sequentially according to logical address. The nth entry in the GAT contains the meta-block address for the logical group with address "n." It is preferably a table in flash memory, comprising a set of sectors (referred to as GAT sectors) with entries defining meta-block addresses for every logical group in the memory system. The GAT sectors are located in one or more dedicated control blocks (referred to as GAT blocks) in flash memory.

Such flash file system concepts are more fully described in U.S. Pat. No. 7,139,864 to Bennett, et al., the disclosure of which is incorporated herein by reference in its entirety.

Scrambling

From a logical point of view, the data stored in the memory cell array can be represented as a two-dimensional (2D) bitmap with the bit-lines on one axis and the word-lines on the other. With this in mind, effective data pattern scrambling fundamentally accomplishes two things: (1) manipulate data bits appropriately to alter the programmed pattern of memory cell states; and (2) minimize the alignment of memory cells programmed to the same states from word-line to word-line, and also from bit-line to bit-line.

FIGS. 3A and 3B depict conceptual block diagrams for an exemplary Data Pattern Scrambler 150 and Descrambler 170, respectively, also referred to herein simply as a Scrambler. Such a Scrambler is based on a simple encryption method using exclusive-OR (XOR) logic and a known key. The simple XOR logic provides for scrambling data using the key, and then descrambling to get the original data back using the same key. In FIG. 3A, unscrambled data from a host is conveyed on bus 152 to an XOR block 156. In addition, a scrambling key is conveyed on bus 154 to the XOR block 156, which then performs a bit-wise XOR operation to generate the scrambled data conveyed on bus 158. The key generator 168 receives a clock signal 160, a seed key on bus 162, and a starting key number SKN on bus 164 (explained below), from which it generates the scrambling key on bus 154. In FIG. 3B, scrambled data from memory is conveyed on bus 172 to an XOR block 176. The scrambling key is conveyed on bus 174 to the XOR block 176, which then performs a bit-wise XOR operation to generate the unscrambled data conveyed on bus 178. As before, the key generator 188 receives a clock signal 180, a seed key on bus 182, and a starting key number SKN on bus 184, from which it generates the descrambling key on bus 174. Even though shown as separate blocks, the XOR block and Key generator block may be shared and used for both scrambling and descrambling, with appropriate steering of the various input and output busses. Bit-wise XOR operation between Host data and Scrambler Keys enables simple descrambling with the known Seed and Key number used to scramble.

Consequently, the core of the Scrambler 150 and Descrambler 170 essentially becomes the generations of the Keys. Instead of regarding Keys as numbers, such keys may be viewed as strings of 1's and 0's. Controlling the bit ordering and the number of 1's and 0's in the strings is one of the underlying principles to generating suitable Scrambling Keys.

A set of bit strings can be easily generated by rotating an initial bit string, refer to as the Seed, one bit at a time until the pattern of bits starts repeating. This can be accomplished by employing a fixed length shift register to create a sequence of rotating Keys with the Key values being controlled by the initial Seed value. For example, an 8-bit shift register can produce up to 8 unique Keys. An exemplary set of rotating 8-bit keys (left direction) are shown in FIG. 4. In this example, Key0 is followed by Key1, which is followed by Key2, etc. Of course, an initial bit string alternatively could be rotated to the right to generate a sequence of rotating keys. In some embodiments, a serial shifter may be used, while in other embodiments other shifters, such as a barrel shifter, may be used.

Referring now to FIG. 5, an exemplary set of rotating 32-bit keys are shown, which are rotated to the left to produce 32 distinct scrambling keys. The initial key, Key0, takes on the value of the seed key, which is 0x695334C6. Other seed keys are contemplated, and may be empirically determined. The seed key preferably provides a good amount of "randomness" of its bit pattern, and also preferably balances the number of 1's and 0's in the key. Each successive key is generated by a single-bit left rotation of the preceding key. For example, Key1 is generated by left-shifting Key0 by one bit position. The 32 different key are also numbered, as shown in the table, and a given key number represents the seed key rotated by a number of bits equal to the key number. For example, Key21 represents the seed key, Key0, rotated by 21 bits to the left. This key may be generated by single-bit rotating the seed key 21 times (e.g., once per clock), or may be generated in a single clock cycle using a barrel shifter, or possible by other techniques.

Thus, in certain embodiments, the Scrambler Key may be generated from an initial Seed Key which may be rotated one bit at a time to create successive Scrambler Keys. The Seed preferably is a minimum of 32 bits long (although any other length may also be used), and preferably has a predetermined hardware default value, which firmware (FW) may change during initialization (as further described below). Every 32 bits of data are XOR'ed with a Scrambler Key, after which the next Key is automatically generated (e.g., by left-rotating the current Key to create the next Key) to be used with the next 32 bits of data. Only the Seed, which is the initial Key, needs to be set by the FW because subsequent Keys are automatically generated for each new cycle (e.g., by toggling the CLK signal shown in FIGS. 3A and 3B).

The Keys are logically XOR'ed with chunks of data (e.g., 32 bits of data), thus the number of 1's and 0's in the Keys causes data bits to toggle, which directly translates to memory cell states being scrambled across the word-lines. After 128 bytes (32 Keys*32 bits/8 bits/byte) from the beginning of the memory page, the key number will wrap around and the scrambling pattern will repeat itself. This is visually depicted in FIG. 6, which shows several memory pages 208, 216, 224, etc. of a memory block 200. The first 32-bit word (labeled 202) of the first memory page 208 is scrambled using Key0. As additional words in the page 208 are written, the key number is incremented as shown, so that the thirty-second word (labeled 204) is scrambled using Key31. The next word written (labeled 206) is scrambled using Key0, as the 32-keys are reused for each subsequent group of 32 words in the page. Since the purpose of the Scrambler is to avoid fixed patterns rather than to encrypt the data, re-using the keys after 128 bytes is sufficient "randomness" to break up memory cell states across a word line (i.e., from bit line to bit line). However, other randomization techniques may be employed, as noted below, that may be even more "random."

To break up memory cell states going down the bit-lines, each page starts using a different key. The first 32-bit word (labeled 210) of the next memory page 216 is scrambled using Key1. As additional words in the page 216 are written (or read), the key number is incremented, as before, so that the thirty-first word (labeled 212) is scrambled using Key31, and the thirty-second word (labeled 214) is scrambled using Key0. The subsequent word 215 scrambled using Key1 since, as before, the 32 different keys are reused for each subsequent group of 32 words in the page.

The identification of the first key to be used for each page may be provided by a Starting Key Number (SKN), which acts as an index or offset from a fixed reference point (i.e., Key0 or the Seed). The index is changed on every logical page transition to create a staggered bit pattern produced from the bit strings of the rotating Keys. Such a logical page address transition occurs when transitioning from one word line to the next word line, and may also occur within a single word line (e.g., in an MLC cell having an upper page and a lower page stored in the memory cells of a given word line, and also if a word line has more memory cells than the number of bits in a page). The ability to offset the starting Key results in a bitmap-like pattern of walking 0's and 1's that when XOR'ed with the data, produces a striping effect across the memory cell array. Thus, the Scrambler Keys serve the purpose of toggling bits. The rotation of the Keys serves to shift the bit patterns across the word lines (and across different pages). The Starting Key Number serves the purpose of shifting the bit patterns going down the bit-lines, while setting the correct Key according to the appropriate page.

To help determine which Key should be used for a given byte within a page (i.e., along a word line), we introduce a D-Word Offset Number, which counts from 0 to 31, starting with the first word of a page, then repeats for subsequent groups of 32 words. In other words, the D-Word Offset Number counts from 0 to 31 over and over, and indicates which key to use, relative to the first key in the page (which may be Key0, as in page 208, or another initial key, as shown in the other pages 216, 224, etc.) This D-Word Offset Number is derived from the Column Offset of the first sector to be accessed within a physical page, and may be calculated by the following formula:

$$D-\text{Word offset} = \text{round\_down}\left[\text{mod}\left(\frac{\text{Column\_Start}}{\text{Key\_Length}(=4)}, \text{No. of keys }(=32)\right), 0\right]$$

Column_Start is the first data byte, including header and data bytes (but excluding ECC bytes unless such ECC bytes are also scrambled) in the physical page from which we start reading or to which we start writing. It is calculated by the sum of the header length (e.g., 6 bytes, 14 bytes, or other suitable value)+data field length (e.g., 512 bytes, 2048 bytes, or other suitable value) of all the previous sectors (or, for some embodiments, ECC pages) in the physical page. The Key_Length is the length, in bytes, of each Scrambling Key. The "mod" function (i.e., "modulo" function) returns the remainder of the first argument divided by the second argument, while the "round_down" function returns the first argument rounded to the number of digits indicated by the second argument. Since here the indicated number of digits is 0, the function rounds down to an integer. A numeric example is described below in relation to FIG. 10.

The D-Word Offset is typically set to zero for the first sector of each page, but is typically not zero for the other sectors in the physical page, since the sector lengths are frequently are not an even multiple of 128 bytes (i.e., 4-byte keys, times 32 keys=128 bytes). All pages preferably start with a zero column offset regardless of the meta-page configuration (i.e., the number of physical pages in the meta-page).

As described above, the SKN may be viewed as indicating which of the 32 keys should be used for the first word in the physical page. In some embodiments, the SKN may be calculated by taking the lower 5 bits of the sum of the Page Offset Number and the D-Word Offset Number, as shown in the following equation:

SKN=mod[(SKN Page Offset+SKN D.Word Offset),32]

The Page Offset Number is preferably set to either the lowest 5 bits of the physical page address within the block or the lowest 5 bits of the logical page address within the block. This relationship may be seen in FIG. 6 by observing, for example, that the SKN of the first sector within each page (where D-Word Offset=0) is identical to the Page Offset number. If the size of each sector within a page is an even multiple of 128 bytes, then each sector would start with the same SKN. However, frequently sector sizes are chosen such that each sector within a page has a different SKN.

For certain sector sizes that are not an even multiple of 4 bytes, the first byte of a new sector may fall within a 32-bit word (and thus within a 32-bit Scrambling Key). We introduce a Byte Offset number to indicate the starting byte position within a given 32-bit Scrambler Key. This is necessary to address keys spanning across sector boundaries (or alternatively, across ECC page boundaries), which is an important consideration in determining the correct SKN when performing a memory read with a non-zero column offset (i.e. starting read in the middle of a memory page). The byte offset is typically set to zero for the first sector of each page. The byte offset for other sectors depends on the sector size (or ECC page size), excluding ECC, and sector number or ECC page number. The Byte Offset number may be calculated by the following formula:

Byte offset=mod(Column_Start,Key_Length(=4))

As before, the Column_Start is the first data byte (including header and data bytes, excluding ECC bytes) in the physical page from which we start reading or to which we start writing. Thus, the Byte Offset counts from 0 to 3 over and over for increasing Column_Start values. Said differently, the Byte Offset value indicates which of the four bytes of a Scrambling Key corresponds to a given byte within a physical page.

A Byte Offset Number example with 32-bit Keys is shown in FIG. 7. The first sector, Sector 0, is 518 bytes long (reflecting, for example, a 6-byte header and a 512-byte data portion). Since this is not an even multiple of 4 bytes, this sector ends in the middle of a Scrambling Key1. (Recall from FIG. 6 that byte 512 corresponds to the first byte in Key0, since this byte is an even multiple of 128 bytes.) The first byte in Sector 1 corresponds to byte 2 within Key1. Sector 1 thus begins with a Byte Offset value=2, and a D-Word Offset value=1. This may be seen in FIG. 8, which shows the SKN calculation for a page including 16 sectors. The first two pages are indicated in the table, corresponding to Page Offset Values of 0 and 1. The first sector in each page includes a 6-byte header, and additional sectors within each page each include a 2-byte header. The first two lines of this table correspond to the example graphically shown in FIG. 7. In particular, the second line indicates a D-Word Offset value=1, and a Byte Offset value=2. It may also be appreciated that the SKN of sectors within a given page are not all the same, as described above. Moreover, the SKN of the first sector of each page is identical to the Page Offset number, as described above.

Figure 9:
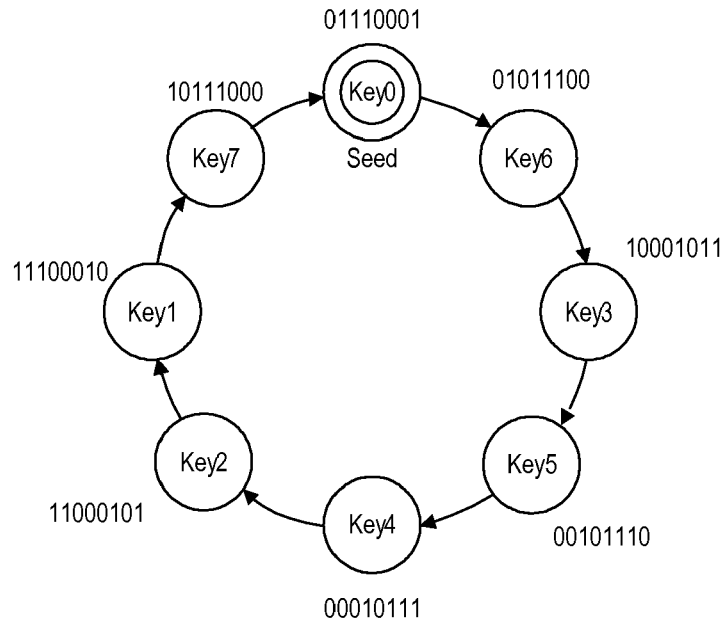
FIG. 9 is a diagram of another exemplary sequence of 8-bit scrambling keys.

In certain other embodiments, subsequent Scrambler Keys may be generated in other ways than a simple single-bit rotation of a starting key, to improve the "randomness" of the scrambling keys. For example, each subsequent key may be derived from an initial number or Seed which is rotated multiple times to create additional Scrambler Keys. After each XOR operation, the next key number is calculated (e.g., calculating by how many bits to left-rotate the key) and the key is rotated accordingly. By so doing, the Scrambling Keys are less repetitive, and thus XOR the data with a more random-like data pattern than is achievable using a simple single-bit rotation. An exemplary calculated key sequence of 8-bit keys is shown in FIG. 9. Each Scrambling Key is a left rotation of the original seed by the Key Number, i.e. Key6 is the seed Key0 left-rotated by 6 bits, but as shown, each subsequent key is not merely a single bit shift of the previous key. In this example, Key0 is followed by Key6, which is followed by Key3, etc.

As before, however, 32-bit keys (or larger) are more suitable than 8-bit keys. In such an example, the Starting Key Number (SKN) may be recursively calculated according to the following formulas:

$$K_n = \text{seed rotated left by SKN}_n$$

$$SKN_{n+1} = [SKN_n + C + P + (SKN_n + P)] \gg 5$$

Where:

C=DWord Offset & 0x1f

P=Page Offset Number & 0x1f $SKN_0 = P$

Figure 10:
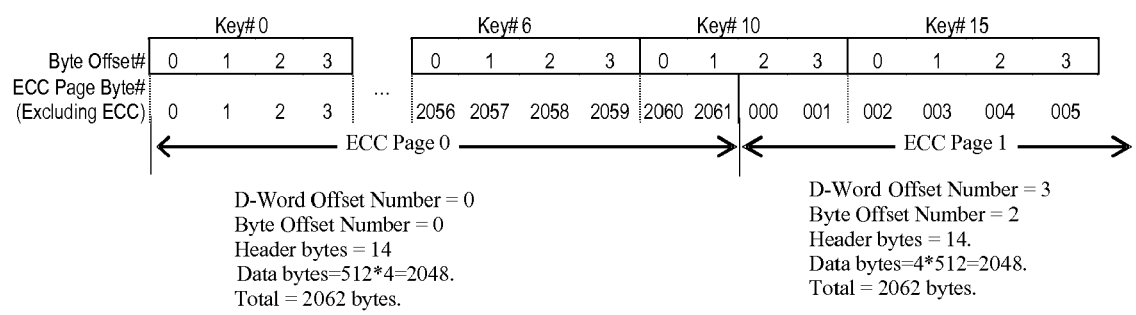
FIG. 10 is another diagram illustrating a sector boundary falling in the middle of a scrambling key.

The Page Offset Number, the D-word offset number, and the Byte Offset Number are calculated as before, using the formulas shown above. The ">>" operator is a right non-circular shift function, resulting here in a "divide by 32 without remainder" function. The "&" operator is a bit-wise AND operator. An example illustrating the calculation of the D-Word Offset Number and the Byte Offset Number, for a memory having 2062-byte ECC pages, is shown in FIG. 10. Each ECC page includes a 14-byte header and four 512-byte sectors, for a total of 2062 bytes.

A partial page may be accessed without necessarily accessing the entire page. Setting the SKN and calculating the correct Key provides for correct reading or writing from any sector in the Card without having to read/write any additional sectors to set the scrambling Key. Preferably, the FW sets the Starting Key Number and configures the Scrambler appropriately for scrambling/descrambling starting at any ECC page in the memory card. As further explained below, the SKN is set at the beginning of each chunk according to either the logical block address (LBA) address or the physical location of the first sector to be written/read. The FW sets the SKN in addition to setting the Page Offset Number, the D-Word Offset number and the Byte Offset Number registers. After setting the SKN, the key generator (e.g., hardware, or firmware) can calculate the correct scrambling Key for the particular sector that is about to be read or written.

Whenever an operation starts in the middle of a page, the Page Offset, D-Word Offset, and the Byte Offset registers may be set by FW according to the table shown in FIG. 11. This table reflects the example, introduced above, of 2062-byte ECC pages each including four sectors preceded by a 14-byte header, and other sizes are, of course, clearly contemplated. The D-Word Offset and the Byte Offset registers are preferably cleared when setting the Page Offset register (since most reads and writes start at the beginning of a page), so they should be set after the Page Offset Register is set. After these registers are set, FW can then set the SKN value according to the table shown in FIG. 12. Such a table is preferably hard-coded in the FW so that an SKN may be quickly determined without having to perform the recursive calculation for each memory access. Alternatively, the table may be created by the FW during initialization by recursively calculating the corresponding SKN for each of the four ECC pages within each of the thirty-two physical pages (i.e., corresponding to each value of the Page Offset Number). By doing the lengthy recursive calculations once, and saving the table, the FW can quickly determine an SKN without having to perform the recursive calculation for each memory access.

Whenever a sequential operation (read/write) crosses a page boundary and is about to access the next page, the SKN has to be adjusted to that of the next page. Setting the Key value at a physical page crossing within a meta-page (such as at plane or die boundary) is preferably done by hardware (HW), by manually clearing the D-Word Offset and the Byte Offset Registers while keeping the Page Offset value as it is. Setting the Key value at a meta-page crossing is preferably done automatically by HW when directed by FW by writing a '1' in the Page Increment bit of an SKN Auto Increment Register, which will initiate the key adjustment. The Auto Page Increment bit is preferably set between meta-page transactions, and preferably is automatically cleared after the Key adjustment by HW.

Within a memory system or controller, the Scrambler may be placed between the buffer management unit (BMU) and the Flash interface (+ECC). During write transfers, the scrambling can occur after multiplexing the fill pattern data, which allows the fill data to be scrambled as well. ECC check bit generation may be performed after scrambling (on the scrambled data), and need not pass through the Scrambler. There is no issue here, as the ECC bits themselves are already random, so there is no need to scramble them again. Also, given the data structure design, duplicate sector data patterns (including the header) will rarely be repeated on consecutive pages.

During read transfers, descrambling occurs after the miscomparison counting (which may be employed to also detect "erased" sectors and "bad block" markers, as noted below). ECC error detection may be performed prior to descrambling, but correction is preferably performed after such descrambling. This eliminates the need to buffer the entire sector in order to correct any ECC bits before descrambling, and thus eliminates any performance impact due to such additional buffering. This is possible since any ECC errors in the original data stream should not affect the unscrambled data stream beyond the individual bits which are in error, as there is no feedback mechanism between the data and the generation of the next key.

Support for On-Chip Copy Functions

The Page Tag feature enables intact blocks to begin with any given logical page. i.e., any LBA can be written to any given physical page within the block, according to the Page Tag value. On-Chip Copy functions enable copying data between different blocks of the same die without fully passing the data through the Controller. Since the Scrambler resides outside of the NAND, On-Chip Copy necessarily implies that the data is copied intact (i.e., without being de-scrambled and then re-scrambled). Consequently, the same scrambling key will be used for the same logical page address, regardless of the physical pages they are written to.

Support for on-chip copy (OCC) is achieved through setting the Page Offset Number Register based on the logical address rather than the physical address (at least for most block types). As noted below, the Page Offset Number Register for some block types (e.g., control blocks) may remain based on the physical address.

Logical Page Calculation

Similarly to the way a meta-block is divided into physical meta-pages, a Logical Group can be divided into Logical Pages. Each Logical Page has the same size as one meta-page, and there are as many Logical Pages in a Logical Group as there are meta-pages in a meta-block. The Logical Page Address (i.e., Logical Page value) may be determined from the LBA value by first dividing the LBA value by the meta-page size. If there are only 32 different keys (32 bits), we then take only the lower 5 bits, as described by the following formula:

$$\text{Logical Page} = \text{mod}\left(\text{RoundDown}\left(\frac{LBA}{\text{meta-page size}}, 0\right), 32\right)$$

All the sectors within a meta-page have the same Logical Page value, which is also described herein as the Logical Page Offset value. The specific scrambling key of each sector is different, since the D-Word Offset and Byte Offset registers have different values according to the sector offset within the page, as explained above.

Initialization

During initialization the FW scans the blocks in the Open Block List to determine what the last state of the card was prior to the power cycle. The block type (i.e., control, data, etc.) is determined according to the ID byte in the header (as further described below), and the Open Update Block List is built through scanning the headers and reading the LBAs of the sectors written in the open blocks. During initialization and prior to building the Open Update Block List, the stored data is preferably entirely scrambled. This situation creates a Chicken-and-Egg problem in that reading must be performed to determine the LBAs of each sector, but in order to properly read the content of each sector, the Logical Page address (which is based on the LBA) is required to properly set the descrambling Key to unscramble the data. The resolution to this initialization dilemma is to store scrambling key information (i.e. the SKN Page Offset Number, or other information from which the scrambling key may be determined) in the scrambled sector headers and then extract it during card initialization.

After the initialization is completed there is no need to extract the SKN from the header, as the FW knows the location, the block type and the Page Offset Register value of each sector in the card. Therefore, the FW can set the Scrambler Registers correctly, then the HW can read and descramble the data as if the Scrambler is transparent to the FW.

Storing the Scrambling Key Information in the Header

The page headers preferably include a 5-bit field (or other appropriate length) for the Page Offset Number (or other scrambling key information) that is used to determine the scrambling key for scrambling the data for the given page. Many different arrangements are possible, including the header format indicated in FIG. 13, which includes a 6-byte LBA/control header for the first sector in a page and a 2-byte header for the rest of the sectors, and which is suitable for single-sector ECC pages (i.e., each sector protected by its own ECC redundancy bytes). The 2-byte header is the same as the 6-byte header, except without the first 4 bytes, as the LBA need only be stored in the first sector of the page. The Data Structure ID field (also referred to herein as a Sector ID field) may be used to identify what kind of sector it is (e.g., control, data, etc.). The Application Byte field is reserved for use by individual applications.

In certain embodiments it may be desirable to provide for a larger page size. For example, the ECC page size may be 4 sectors long (i.e., each 2KB of user data information is protected by a single cluster of ECC redundancy bytes) and each ECC page may have a single header of 14 bytes, as shown in FIG. 14, including a 2-byte sector header for each of the four sectors, and the LBA of the page. Each 2-byte Sector Header includes a Page Offset field, which is used to determine which Page Offset Number was used to scramble the data for the given page.

Figure 15:
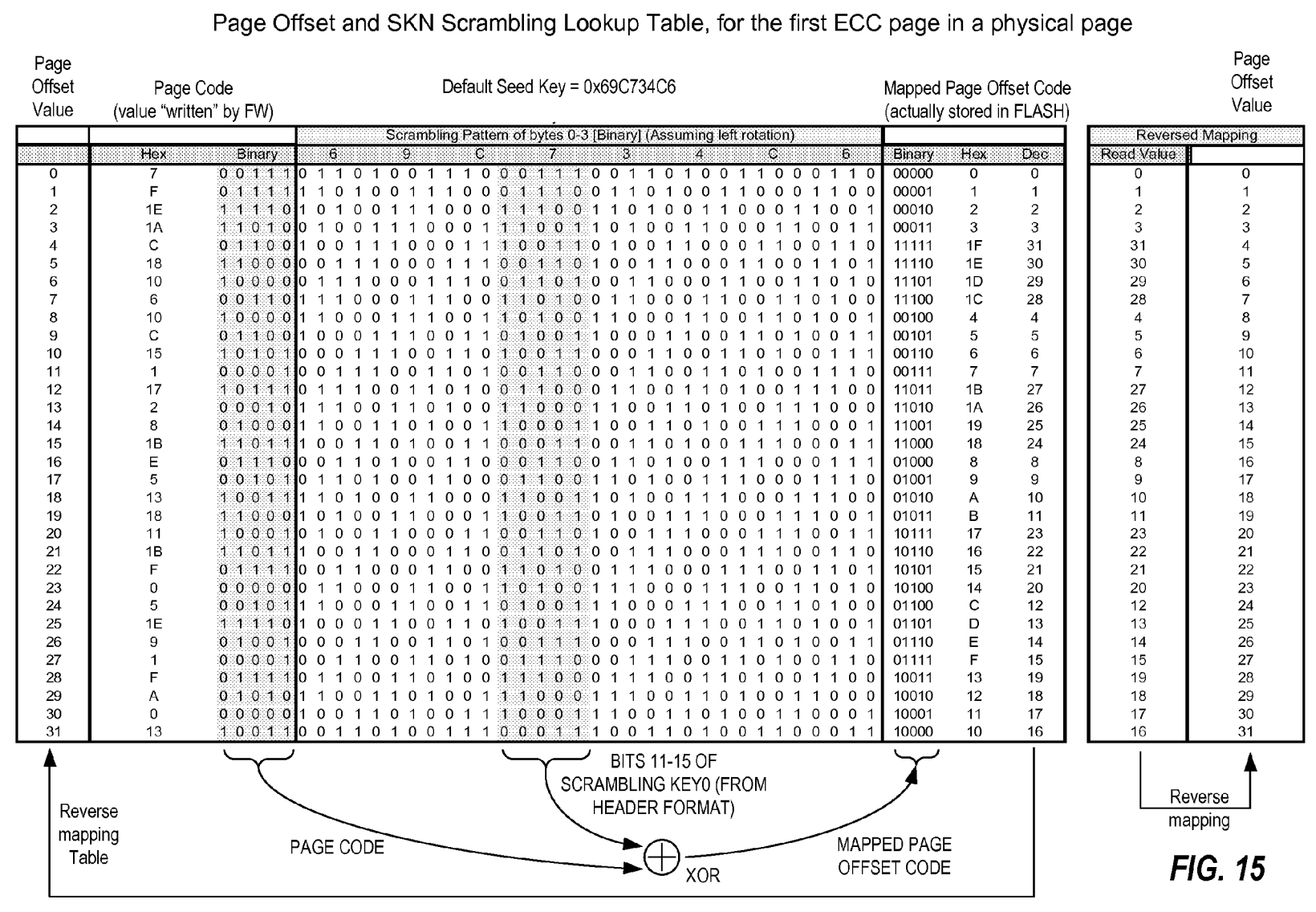

Since the header itself is preferably scrambled, along with the data in the rest of the sector, the actual Page Offset value is not directly written into the header. Instead, a Page Code is written by the FW into the header, which is then scrambled (i.e., by HW) to generate a Mapped Page Offset Code which is actually written into the memory page. An exemplary page offset mapping table is shown in FIG. 15, which corresponds to a Seed of 0x69C734C6. Other mapping tables are also possible for this same default seed, and different mapping tables for other default Seeds, but conceptually such tables will be similar to this table. The first column of this table is the Page Offset value (ranging from 0 to 31 since there are 32 keys). The second column lists a corresponding Page Code, which is the value written into the memory page by the FW. Since the scrambling key for a page is dependent upon the Page Offset value, each page will be scrambled differently. For this example, since the 5-bit Page Offset field for Sector 0 corresponds to bit positions 11-15 of the first word in Sector 0, each written Page Code is scrambled by bits 11-15 of the corresponding Scrambling Key for the particular page (shown in the third column), to generate the Mapped Page Offset Code shown in the fourth column.

This lookup table provides a 1-to-1 mapping between the Page Offset value and a Page Code that can be written by the FW and scrambled and stored in the memory page. A reverse mapping table, shown at the right side of FIG. 15, provides a 1-to-1 mapping between the scrambled 5-bit value actually stored in the header and read with the scrambler disabled, and the corresponding unscrambled Page Offset value (i.e., the SKN value for the first sector in a page). Such lookup tables are based on the particular Seed chosen, and are preferably stored by the FW in RAM to provide fast mapping during a write, and quick determination of the SKN after reading the scrambled header.

During write commands, the FW knows the logical address, the target physical location and the block type of the write command. Therefore, the FW knows the Page Offset value, whether it's based on a Logical Page or a Physical Page (e.g., such as for a control block, as described elsewhere herein). As part of every write command, the FW can look up the Page Offset value in the Page Offset Mapping table and write the 5-bit Page Code from the table into the Page Offset field in the header. Those 5 bits will be scrambled (e.g., by HW), along with the data in the page, and no special handling is needed. After scrambling, each one of the 5-bit Mapped Page Offset Code combinations will have a distinct value, which may be used to uniquely identify the Page Offset value during initialization.

Extracting the SKN from the Header

During initialization, the header may be read with the Scrambler bypassed, since the Key is still unknown. Since the entire header itself is preferably scrambled, the Page Offset Number cannot simply be read with the scrambler disabled. Instead, the Mapped Page Offset Code is read, and the Page Offset value is determined, such as by using the reverse mapping lookup table of FIG. 15, and the scrambling Key is calculated. Since only the headers at the beginning of each meta-page need be read during initialization, the Page Offset extracted from the 5-bit header field corresponds to the final SKN value, because the D-Word Offset and the Byte Offset are both equal to zero. Such tables alternatively may be replaced by a translation function. Use of such tables guarantees a 1:1 mapping between the Page Offset value and the 5-bits field actually written in the header.

Once the SKN is known, the FW can calculate the Scrambling key by left rotating the Scrambling Seed by SKN places to the left. Once the key is known, the FW can XOR the header data with the scrambling key and resolve the header information. An alternative is to enable the scrambler, set the Scrambler Registers, and re-read the sector using the Scrambler circuitry to de-scramble the data, but since the header is usually only several bytes long (e.g., 6 bytes, 14 bytes, etc.), merely XOR'ing the data in FW may be much simpler and faster. When descrambling in FW, the FW has to calculate the rotation of the Key (or shift the Key, as appropriate) after each XOR operation as described above.

Figure 16:
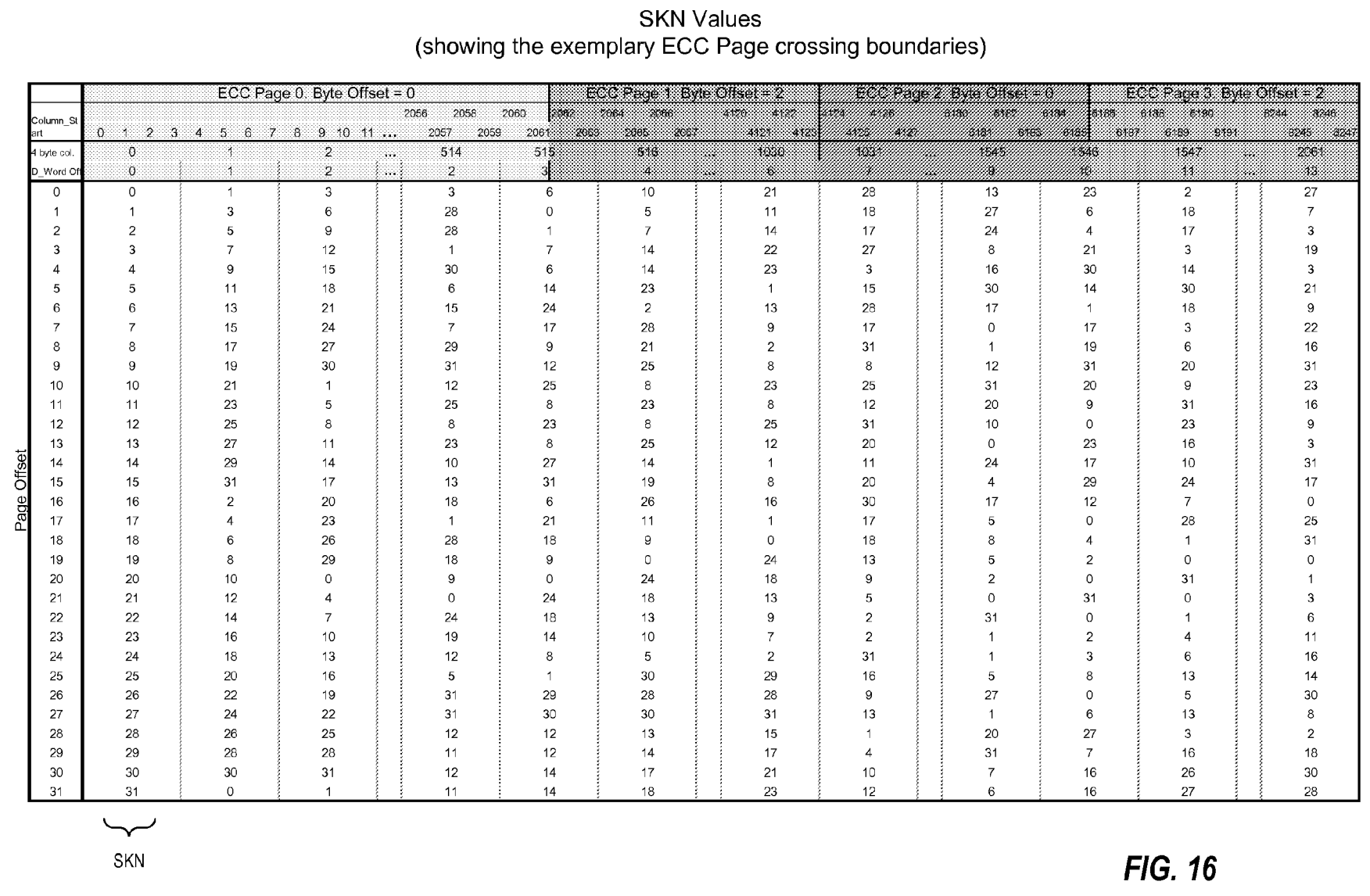

The tables shown in FIG. 15 refer only to the first ECC page within the physical page, as the scrambling keys, and hence the values written to the flash, are different for other ECC pages within the physical page. This is shown, for the exemplary embodiment thus far described, by the table depicted in FIG. 16. This table shows the SKN value for each of the four ECC pages in a physical page, for each of the thirty-two Page Offset values. The table also shows the Column_Start value, D-Word Offset value, and Byte Offset value for each byte position in the entire physical page, and the corresponding SKN. This is another table that is preferably built by FW upon initialization to speed determination of the SKN operation, especially for memory reads and writes that do not start at the beginning of a page, and is particularly helpful if the SKN is calculated recursively, such as described above.

Page Offset Number in Sequential Update Blocks/Intact Blocks

Sequential Update Blocks, or Intact Blocks, set the Page Tag offset parameter at the very first write to the block. It is determined by the offset of the first logical page that is written to the Update Block within its corresponding logical group. A logical page may be a set of contiguous sectors which are written to one full meta-page, i.e. it has the size of a meta-page and it is aligned to meta-page boundaries. Once the Page Tag parameter is set, all the logical pages written in the Update Block are written sequentially from the first page, and each logical page will have the same offset relative to the physical pages in which it is written.

In order to make the scrambling key independent of the Page Tag value, the Page Offset Number Register setting is determined according to the Logical Page value, rather than the Physical Page value. In the event the Page Tag is zero, the two values coincide.

Page Offset Number in Chaotic Update Blocks

A block written in non-sequential sector order is known as a Chaotic Update Block. Similarly to the Sequential Update Blocks, Chaotic Update Blocks also use the Logical Page as the Page Offset Number, thus enabling the use of the on-chip copy functions. The issue here is that since the same page can be written over and over to the same block, all the pages may use the same scrambling key, resulting in a repeating pattern throughout the block. This potential issue may be averted by using only the lower memory page for Chaotic Update Blocks (i.e., only writing 2 of the 4 MLC states per memory cell, thus treating the block as a binary block) to mitigate the boosting effect that results from the repetitive pattern, and thus avoid the program disturb phenomenon. As can be seen in FIG. 2C, the improved margins are achieved because the difference in threshold voltage between the two states when writing only the lower page is greater than if writing both the lower and upper pages.

Page Offset Number in Control Blocks and Scratch Pad Blocks

Control blocks don't use on-chip copy, since they are mainly accessed on a single sector basis. Therefore, the Physical Page is preferably used as the Page Offset Number, so that each page is scrambled with a Key corresponding to the physical page number that it was written to. The continually-changing page number will guarantee that a different scrambling Key will be used as additional pages get written down the block and thus avoid the occurrence of the worst case patterns which cause the PD issues. In addition, such control blocks may also use only the lower memory page to increase the signal margins of the memory cells.

Scrambling Data in File System Blocks

All control blocks are preferably scrambled, including the Boot Block and the firmware (FW) blocks (which are included within the file system blocks). In an exemplary Flash File System, the Boot Block is scanned and read by the FW to find the pointers to the File System Blocks, which are also partially read by the FW. Since both the Boot Block and the File System Blocks are scrambled when written, the FW must be able to descramble the data. Only the functionality needed for page read (+descrambling) has to be supported by the FW. Specifically the FW should support setting the various registers that load the Seed, and specifying which descrambling Key to use.

The first page in the Boot Block, which holds information regarding the meta-block geometry, the ECC level, and the device ID information, preferably includes the Scrambler Seed that was used to scramble the Boot Blocks and the File System Blocks. The first page itself, however, is preferably scrambled using the default Scrambler Seed which is incorporated in the HW. At the beginning of the initialization process, the first page is read using the default Seed. The Seed which is used for the rest of the card is then read from the first page and loaded into the Scrambler, and used for all subsequent operations. The remaining pages in the boot block are scrambled with a Page Offset Register which is set according to the physical page value (like other control blocks). The FW should include the functionality to set the registers according to the physical page offset. For proper Scrambler operation, one should explicitly set the Seed in the Boot Block even if it is the same value as the default Seed. A Seed value of 0 will essentially cause data to not be scrambled even though the Scrambler is enabled.

Bad Block Detection

Generally Bad Block detection may be done with the Scrambler bypassed. At first download there is no issue, as none of the blocks holds any information. In subsequent downloads, after the card already has some information written, it is possible that scrambled data might be misinterpreted as a bad block. Since the bad block marking is different for different vendors, a different detection scheme may need to be used for each vendor.

Some vendors mark factory bad blocks by writing zeros to the entire block. Using the scrambling keys as described above (i.e., the default key value of 0x69C734C6) there cannot be any header combination that after scrambling will result in a "00" value in all of the header bytes (e.g., in the LBA and the data structure ID) and will be stored in the first sectors in the page. Generally, the header should be designed so that after scrambling there is no possibility that all header bytes can be "00." Therefore, a detection scheme which looks for the "00" pattern in the header may be used. Such detection may be easily accomplished with the Scrambler bypassed.

Other vendors mark factory bad blocks by writing a single byte in the user data area (i.e. within the 512 data bytes of a sector, as opposed to the header area or ECC) with any pattern which is not 'FF'. The specific location of the byte changes with the memory type. Big Block (i.e., each page includes more than one sector) MBC memories frequently mark the block as bad by writing a non-FF pattern to byte 2048 of the last page. Big Block BIN memories (i.e., single bit per cell) mark the block as bad by writing a non-FF pattern to byte 2048 of either the first or second pages.

Since the byte which is used for the bad block marking can have a non-FF value after scrambling, it may be accidentally detected as a bad block, as the scrambled data structure ID will also be unrecognized. However, the mis-comparison counting block of the ECC engine may be used to differentiate between factory bad blocks and good blocks, since the ECC engine will indicate an uncorrectable ECC error (i.e., UECC) when all bits are either all zeros or all "FF"s.

During detection the Scrambler is bypassed, and the ECC engine is enabled. If the sector holding the bad block marking is read successfully, the block is detected as a good block, regardless of the value of the bad block marking byte. A sector is read successfully if it results in no UECC or correctable ECC. If reading the sector which holds the bad block marking will result in UECC, and the value of the bad block marking byte is not all "FF", the block is suspected as a bad block. In this case, page 0 of the suspect block is then read. If all sectors in page 0 also result in UECC, the block will be determined as bad. If any sectors in page 0 are read successfully, the block will instead be determined to be a good block. This, of course, represents but one of many possible methods for bad block detection.

Exemplary Implementation

Figure 17:
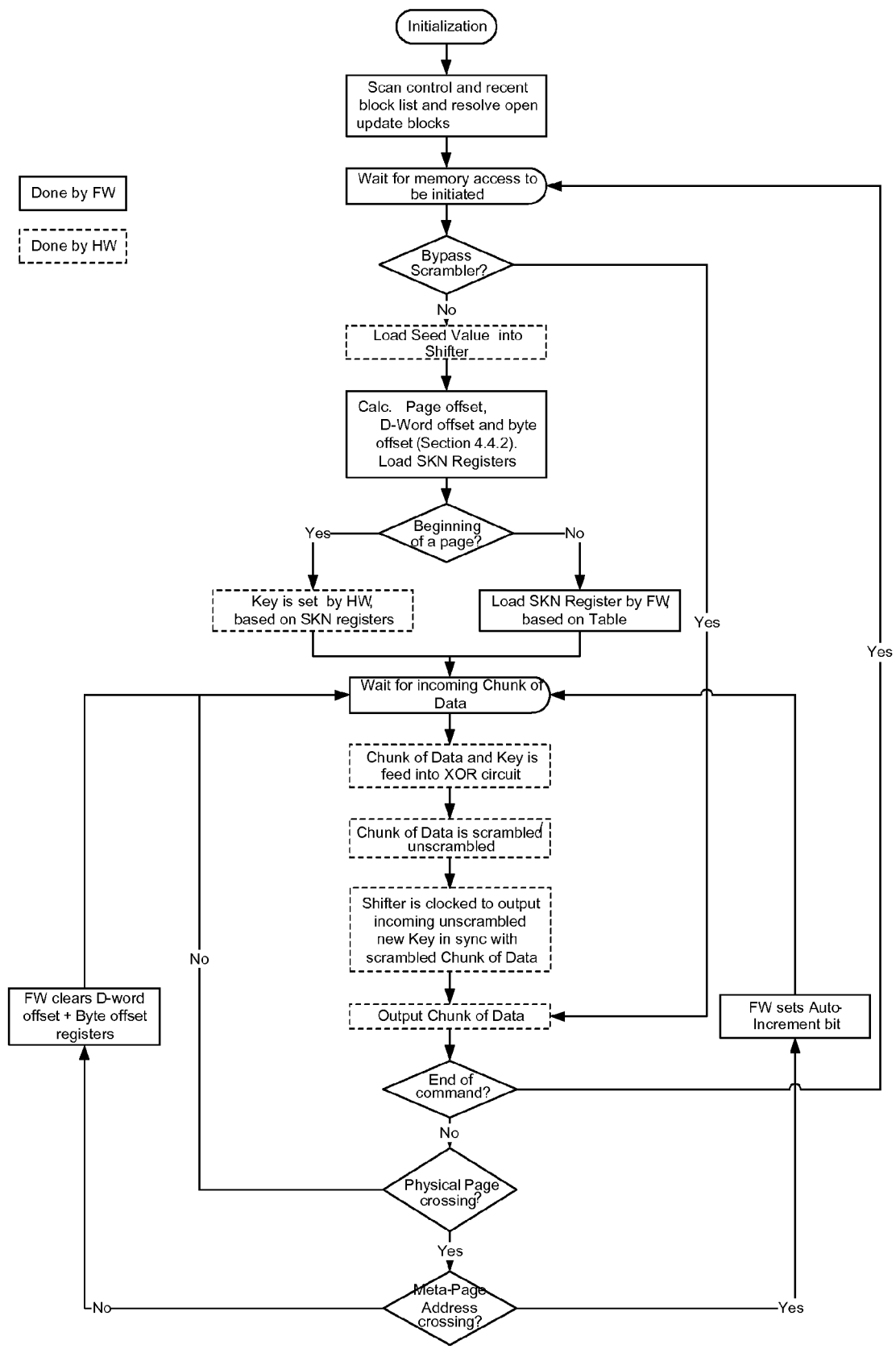
FIG. 17 is a flowchart of exemplary operation of a scrambler in accordance with some embodiments of the present invention.
Figure 18:
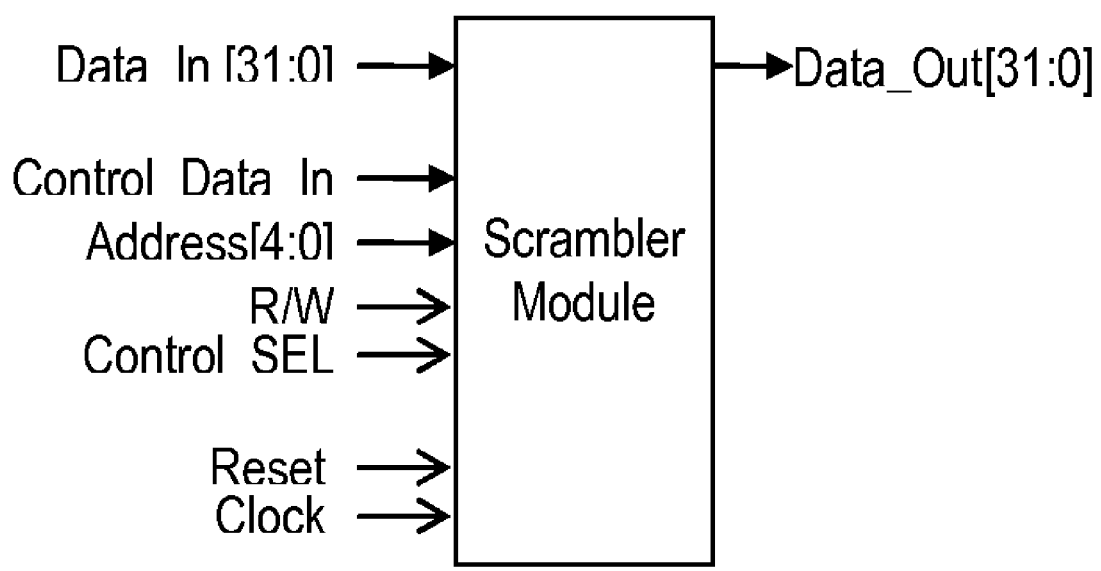
FIG. 18 is a diagram of an exemplary scrambler block in accordance with some embodiments of the present invention.

The above techniques may be carried out in many different specific implementations. An exemplary operating flow diagram which implements the Scrambler functionality described above is shown in FIG. 17. An exemplary module is shown in FIG. 18 and will now be described. Such a Scrambler module is suitable for an ASIC implementation, and preferably is a self-contained hardware block in order to allow easy integration (or removal) among various ASIC projects with no dependencies to the CPU type or on any specific ASIC Design Architectures.

The Scrambler hardware block may be placed directly in the data path. As noted above, the ECC bytes may be scrambled along with the header and user data, in which case the Scrambler block should logically be placed at the end of the data path going to the memory interface. However, since it is not necessary to scramble the ECC bits, the Scrambler may be placed earlier in the data path. A single clock source is sufficient for the Scrambler module. The clock frequency is preferably no less than the bus speed at which the Scrambler module is clocked.

A Data Input bus and Data Output bus of, for example, 32-bits provides for streaming data through the Scrambler, although such port sizes may be limited by an internal ASIC bus to 16-bits. A dedicated 16-bit Control Data Input bus provides access to the control registers. A 5-bit Input Address bus is included for addressing control registers and to latch in the Starting Key Number during HW Flow Control operation.

A set of control lines is preferably included for accessing internal control registers and for HW Flow control. A Reset line may be asserted to reset the Scrambler Module to an initial state and set up for HW Flow operation. A Read/Write (R/W) control signal is provided to control register accesses through Control_Data_In[15:0]. In addition, a Control_SEL line is provided to select between Control Register Access and HW Flow Control modes of operation. Default selection is preferably set to HW Flow Control.

The Scrambler Module includes several registers, including a Seed Register, a Configuration Register, a SKN Page Offset Register, and a SKN Sector Offset Register. The Seed Register is preferably a 32-bit R/W register for storing the Initial Key or Key0, which is the same as the Seed. The default key may be 0x69C734C6, or another suitable value. In addition, a control register is provided to trigger loading of the stored Seed Register value into the Shifter. The Seed Register value does not change on reset.

In addition, a Configuration Register is included to control operation of the Scrambler Module. For example, such control includes whether to enable or disable Shifter continuous rotation. Preferably the default setting is to enable continuous shifter rotation. Disabling rotation forces the use of the same key for the entire memory page (i.e. Keys may be rotated by pre-clocking). The configuration register can also control whether to enable full bypass of the scrambling function, resulting in data flow through the module with no manipulation of the data, with minimal delays, and with minimal power consumption. Preferably the default setting is to enable full bypass.

The SKN Page Offset Register is preferably a 5-bit R/W register for storing the Starting Key Number (e.g., assuming 32 different keys). The default value preferably is 0 (i.e. Key0). In Control Register Access mode, the register value preferably goes back to the default value upon reset. In HW Flow Control mode, the register value is loaded from the Address Input port on reset. The value loaded into the SKN Register is based on the memory page address corresponding to the lower 5 bits of either the physical page address or the logical page address.

The D-Word Offset Number (e.g., 5-bit value) and the Byte Offset Number (e.g., 2-bit value) may be stored in separate registers, but may instead be conveniently combined in a single 7-bit R/W register, which we can call the SKN Sector Offset Register. This SKN Sector Offset Register may be viewed as storing the offset from the Starting Key Number. The default value preferably is 0. Regardless of operation mode, the register value preferably reverts to the default value on reset.

As noted above, this 7-bit register may include two fields based on key sizes of 32 bits, as noted in the following Table 1:

TABLE 1

Exemplary Sector Offset Register Format for 32-bit Keys

| 6 | 5 | 4 | 3 | 2 | 1 | 0 |
|---|---|---|---|---|---|---|
| D_Word Offset Number | | | | | Byte Offset Number | |

The SKN Sector Offset Register bits [6:0] directly correspond to either the memory column address [6:0] or the relative 7-bit byte offset from the start of the logical page (also referred to above as Column_Start value). The 5-bit D-Word Offset Number indicates the offset key number that corresponds to the first byte of the starting sector to be scrambled/descrambled. The D-Word Offset number is relative to the SKN so a value of 0 corresponds to Sector 0 accesses.

The 2-bit Byte Offset Number indicates the starting byte position within one Key. This is necessary to address Keys spanning across sector boundaries, which is an important consideration in determining the correct SKN when performing a memory read with a non-zero column offset (i.e. starting read in the middle of a memory page). The Byte Offset is 0 for Sector0 of each page. The Byte Offset for other sectors depends on the sector size, sector number, and key size in bytes. Examples of D-Word Offset Number and Byte Offset Number based on 32-bit Keys are shown above in regards to FIGS. 7, 8, 10, and 11.

Also internal to the Scrambler Module, a parallel-in/parallel-out shift register or similar circuit is preferably designed that can rotate bits in a constant left direction. The bits shifted out one end circularly return on the other end. A fixed size (e.g., 32 bits) allows easier system implementation to decode the Starting Key Number for memory read with column offsets (see discussion of SKN Page Offset Register). The size also determines the number of Keys available.

On reset, the shift register preferably automatically reloads the Seed and loads the Starting Key Number. It should also allow loading of the initial Key from the Seed Register, and may allow pre-clocking based on a count stored in the SKN Registers. Such a pre-clock count may be based on both the Page Offset Number and the Sector Offset Number stored in the SKN Page Offset Register and the SKN Sector Offset Register, respectively. Using a shift register has inherent latencies, especially with the concept of pre-clocking. These may be addressed by pre-clocking early before data arrival, using a faster clock, and/or utilizing a faster type of shift register such as a barrel-shifter.

The Scrambler Module also includes an XOR circuit having two input ports and one output port, each of up to 32-bit widths for parallel-in/parallel-out operation. One input port is connected to the Data Input port, and the other input port is connected to the Shifter output. The single output port is connected to the Data Output port.

Under HW Flow Control, the full Scrambler operation may be controlled using only the Clock, Reset, and Address[4:0], with no register access required. This is a typical operating mode once the Scrambler registers are configured. Basic scrambling operation may be accomplished, for example, in the following manner. Initially, the Scrambler configuration registers are set up and then switched to HW Flow Control mode. The initial 5-bit memory page address to be accessed is presented on the Address Input bus. Then, on asserting a RST pulse, the Page Starting Key Number Register is loaded from the Address Input bus, and the Seed (i.e., the contents from the Seed Register) is loaded into the Shifter. On Clock transitions, the Scrambler pumps the unscrambled data from the Data Input port, scrambles the data, and outputs the scrambled data to the Data Output port, and continuously operates in this manner until the configuration is changed with Reset. In some embodiments a number of clock transitions may also be required to pre-clock a bit-serial shifter in order to calculate the correct scrambling keys for use by the scrambler. The general operation is identical for unscrambling.

Generally, the Scrambler Module is initialized for memory accesses aligned to the beginning of a memory page. This is a typical mode of operation and requires minimal FW control to (1) enable HW Flow Control operating mode; and (2) send the proper lower 5-bit memory page address to the Scrambler Address Input port. On memory accesses not starting at the beginning of a memory page, the Starting Key Number Register should be loaded with the proper Key value using a Control Register Access operation. After enabling the Control Register Access operating mode, the SKN Page Offset Register is loaded with the memory page address, the SKN Sector Offset Register is loaded with the memory column address, and operation of the Scrambler is then switched to HW Flow Control.

The Scrambler may be controllable with parameter settings stored as control data in the file system. Useful parameters include whether the Scrambler is bypassed, whether the Scrambler default Seed is used or another seed is loaded instead, and whether the shifter is enabled for continuous rotation or disabled, for example, for diagnostic purposes. Such configuration is preferably carried out on power-on initialization.

The figures of the previously-mentioned '905 application are also appropriate to describe certain memory systems and modules in accordance with the present invention, by viewing the randomization module as described therein as generally corresponding instead to a data scrambling module as described herein.

Referring now to FIG. 19, a table is shown listing memory cell states of unscrambled repeating 0xFF data for the first 16 bytes of each word line within a memory block. FIG. 20 shows the scrambled memory cell states of the same first 16 bytes of each word line after scrambling as described above.

Additional Alternatives

In some embodiments, the system may perform a two-step memory read operation, to first extract the SKN by reading with the descrambler disabled and using the extracted SKN to look up the unscrambled key, and then perform a second read with the descrambler enabled using the unscrambled SKN. However, this has implications to overall system performance and possible host timeout concerns. Other embodiments may be possible which trade off system design issues and/or requirements. For example, the header or other control information need not necessarily be scrambled, while still preserving many of the advantages of randomizing the data in a page. As another example, the SKN information may be stored unencrypted in the sector's header.

In some embodiments, the SKN could be stored, rather than the Page Offset value, in the page header. Alternatively, the entire initial Key used for the page could be stored. These, as well as the Page Offset value, could also be stored in a fully unscrambled manner, although this would create potentially undesirable data patterns down the bit lines.

The techniques for generating rotating scrambling keys described above are not the only manner of generating a deterministic sequence of scrambling keys. Another method utilizes a linear shift feedback register (LFSR) to generate a pseudo-random sequence based upon an initial seed. Such a seed can be associated with each page based upon either the logical page address or physical page address in a similar manner as described above. An exemplary use of a LFSR for randomizing data in a flash memory is described in co-pending U.S. patent application Ser. No. 11/808,905, filed Jun. 13, 2007 by Sharon, et al, and entitled "Randomizing for Suppressing Errors in a Flash Memory," the disclosure of which is incorporated herein by reference in its entirety.

The descriptions above frequently make reference to registers for storing certain values, such as the Page Offset Register for storing the Page Offset value. These refer to exemplary scrambler implementations, but are not to be viewed as limiting the more general discussion.

Memory pages frequently include 8-16 sectors, but other values may be used. Each sector typically includes 512 bytes of data and a sector header, and may also include ECC redundancy bytes. In some formats, a single cluster of ECC bytes may protect more than one sector.

The block diagrams herein may be described using the terminology of a single node connecting the blocks. Nonetheless, it should be appreciated that, when required by the context, such a "node" may actually represent a pair of nodes for conveying a differential signal, or may represent multiple separate wires (e.g., a bus) for carrying several related signals or for carrying a plurality of signals forming a digital word. As used herein, coupled means either directly or indirectly.

Terminology used herein that might be viewed as potentially limiting should be viewed as merely descriptive of exemplary embodiments, and not limiting of the invention itself. While the various embodiments have been described in the exemplary context of a non-volatile NAND memory, the invention is also useful for other types of memory devices, including volatile memory devices.

As used herein, the concept of a sequence of keys is really a function of the implementation (e.g., only 32 bits at a time). For example, an 8-key sequence of 8-bit keys, is really no different than a single 64-bit key. For example, if a scrambler key is long enough, you might need only one for a chunk of data of a certain bit width, whereas for shorter keys, a sequence of keys may be required to fully scramble the chunk of data. In some embodiments, more than one seed key may be used, which might be determined, for example, based on the logical address.

The foregoing detailed description has described only a few of the many possible implementations of the present invention. For this reason, this detailed description is intended by way of illustration, and not by way of limitations. Variations and modifications of the embodiments disclosed herein may be made based on the description set forth herein, without departing from the scope and spirit of the invention. Moreover, the inventive concepts and embodiments described above are specifically contemplated to be used alone as well as in various combinations. It is only the following claims, including all equivalents, that are intended to define the scope of this invention. Accordingly, other embodiments, variations, and improvements not described herein are not necessarily excluded from the scope of the invention.

What is claimed is:

1. A method for storing information in a non-volatile memory, said method comprising:
   determining a starting key based upon a seed key and a logical page address associated with a group of data;
   randomizing the group of data using a deterministic sequence of keys corresponding to the starting key;
   storing the randomized group of data into a physical page of the non-volatile memory; and
   storing, into the physical page of the non-volatile memory, additional information from which the starting key may be determined without knowledge of the logical page address, wherein the additional information is stored as randomized information using the deterministic sequence of keys corresponding to the starting key.

2. The method as recited in claim 1 further comprising:
   storing the additional information into more than one location within the physical memory page, so that even if one location is corrupted, another can still be read to determine the starting key.

3. The method as recited in claim 1 wherein the determining comprises:
   determining an index for a sequence of scrambling keys based upon a logical page offset value; and
   using the index to identify the starting key within a repeating sequence of M-bit scrambling keys corresponding to the seed key.

4. The method as recited in claim 3 wherein:
   the additional information comprises the index.

5. A method for storing information in a non-volatile memory, said method comprising:
   determining a starting key based upon a seed key and a logical page address associated with a group of data;
   randomizing the group of data using a deterministic sequence of keys corresponding to the starting key;
   storing the randomized group of data into a physical page of the non-volatile memory; and storing, into the physical page of the non-volatile memory, additional information from which the starting key may be determined without knowledge of the logical page address, wherein the additional information comprises a mapped page offset code having a 1:1 correspondence with a page offset value.

6. The method as recited in claim 5 wherein:
the mapped page offset code is identical with the logical page offset value, and may be directly read from the physical page of the non-volatile memory without de-randomizing.

7. The method as recited in claim 5 further comprising:
determining a page code associated with the logical page offset value; and
randomizing the page code using the deterministic sequence of keys corresponding to the starting key, to generate the mapped page offset code which is stored in the physical page of the non-volatile memory.

8. The method as recited in claim 7 wherein:
the page code is randomized using only the starting key, and the resulting mapped page offset code is written into a page header of the physical page of the non-volatile memory.

9. The method as recited in claim 7 wherein:
the page code is determined by firmware; and
the page code is randomized by hardware.

10. The method as recited in claim 5 further comprising initializing the non-volatile memory upon power-up, said initializing comprising:
reading a randomized memory page header including a mapped page offset code;
extracting a corresponding page offset value from the mapped page offset code; then
determining a starting key based upon the page offset value and the seed key; and
reading and de-randomizing the memory page using a deterministic sequence of scrambling keys corresponding to the starting key.

11. The method as recited in claim 10 wherein said extracting a corresponding page offset value comprises using a lookup table.

12. The method as recited in claim 10 wherein said extracting a corresponding page offset value comprises using a reverse mapping calculation.

13. The method as recited in claim 10 wherein said de-randomizing the memory page comprises de-randomizing at least the memory page header using firmware.

14. The method as recited in claim 10 wherein said de-randomizing the memory page is performed using hardware.

15. The method as recited in claim 10 further comprising:
re-constructing mapping of open blocks to identify block types.

16. The method as recited in claim 5 further comprising:
determining a second starting key based upon the seed key and a physical page address associated with a second group of data;
randomizing the second group of data using a deterministic sequence of keys corresponding to the second starting key; and
storing the randomized second group of data into a second physical page of the non-volatile memory.

17. The method as recited in claim 10 wherein said initializing is performed on blocks whose starting key is based upon its logical page address and on blocks whose starting key is based upon its physical page address.

18. The method as recited in claim 16 wherein:
the second group of data corresponds to a control block of a flash file system.

19. The method as recited in claim 5 further comprising:
determining a third starting key based upon a predetermined default seed key and a physical page address associated with a third group of data;
randomizing the third group of data using a deterministic sequence of keys corresponding to the third starting key; and
storing the randomized third group of data into a third physical page of the non-volatile memory.

20. The method as recited in claim 1 further comprising:
ECC encoding the randomized group of data and storing non-randomized ECC redundancy bytes in the non-volatile memory.

21. The method as recited in claim 1 further comprising:
ECC encoding the non-randomized group of data to generate corresponding ECC bytes;
randomizing the corresponding ECC redundancy bytes; and
storing randomized ECC redundancy bytes in the non-volatile memory.

22. The method as recited in claim 1 further comprising:
randomizing all page header information written into the non-volatile memory.

23. The method as recited in claim 22 further comprising:
randomizing control blocks for a flash file system using a physical page address rather than a logical page address.

24. The method as recited in claim 22 further comprising:
randomizing boot blocks for a flash file system using a predetermined default seed key, and using a physical page address.

25. The method as recited in claim 1 wherein the deterministic sequence of keys comprises:
a number M of separate scrambling keys, each comprising M-bits, wherein each respective scrambling key N (KeyN) corresponds to an N-bit circular rotation of a predetermined seed key (Key0).

26. The method as recited in claim 25 wherein the randomizing comprises a bit-by-bit XOR operation using the deterministic sequence of M-bit scrambling keys.

27. The method as recited in claim 26 wherein each successive scrambling key in the deterministic sequence is a single-bit rotation of the preceding scrambling key.

28. The method as recited in claim 26 wherein each successive scrambling key in the deterministic sequence is a bit-wise rotation of the seed key by a calculated number of bits.

29. The method as recited in claim 28 wherein the calculated number of bits for the successive key depends on the current key.

30. The method as recited in claim 29 wherein the calculated number of bits for the successive key also depends on the page offset value and the D-word offset value of the corresponding successive word.

31. The method as recited in claim 1 wherein the deterministic sequence of keys comprises:
a pseudo-random sequence of keys generated by a linear feedback shift register (LFSR) having a starting value corresponding to the starting key.

32. An apparatus comprising:
a non-volatile memory; and
a memory controller configured to:
determine a starting key based upon a seed key and a logical page address associated with a group of data;

randomize the group of data using a deterministic sequence of keys corresponding to the starting key;

store the randomized group of data into a physical page of the non-volatile memory; and store, into the physical page of the non-volatile memory, additional information from which the starting key may be determined without knowledge of the logical page address, wherein the additional information is stored as randomized information using the deterministic sequence of keys corresponding to the starting key.

33. The apparatus as recited in claim 32 wherein the non-volatile memory comprises a distinct integrated circuit separate from the memory controller.

34. The apparatus as recited in claim 32 wherein the memory controller is further configured to:

determine an index for a sequence of scrambling keys based upon a logical page offset value; and use the index to identify the starting key within a repeating sequence of M-bit scrambling keys corresponding to the seed key.

35. The apparatus as recited in claim 34 wherein:

the additional information comprises the index.

36. An apparatus comprising:

a non-volatile memory; and a memory controller configured to:

determine a starting key based upon a seed key and a logical page address associated with a group of data;

randomize the group of data using a deterministic sequence of keys corresponding to the starting key;

store the randomized group of data into a physical page of the non-volatile memory; and store, into the physical page of the non-volatile memory, additional information from which the starting key may be determined without knowledge of the logical page address, wherein the additional information comprises a mapped page offset code having a 1:1 correspondence with a page offset value.

37. The apparatus as recited in claim 36 wherein the memory controller is further configured to:

determine a page code associated with the logical page offset value; and randomize the page code using the deterministic sequence of keys corresponding to the starting key, to generate the mapped page offset code which is stored in the physical page of the non-volatile memory.

38. The apparatus as recited in claim 37 wherein:

the page code is randomized using only the starting key, and the resulting mapped page offset code is written into a page header of the physical page of the non-volatile memory.

39. The apparatus as recited in claim 36 wherein the memory controller is further configured for initializing the non-volatile memory upon power-up, said initializing comprising:

reading a randomized memory page header including a mapped page offset code;

extracting a corresponding page offset value from the mapped page offset code; then determining a starting key based upon the page offset value and the seed key; and reading and de-randomizing the memory page using a deterministic sequence of scrambling keys corresponding to the starting key.

40. The apparatus as recited in claim 36 wherein the memory controller is further configured to:

determine a second starting key based upon the seed key and a physical page address associated with a second group of data;

randomize the second group of data using a deterministic sequence of keys corresponding to the second starting key; and store the randomized second group of data into a second physical page of the non-volatile memory.

41. The apparatus as recited in claim 39 wherein said initializing is performed on blocks whose starting key is based upon its logical page address and on blocks whose starting key is based upon its physical page address.

42. The apparatus as recited in claim 40 wherein:

the second group of data corresponds to a control block of a flash file system.

43. The apparatus as recited in claim 36 wherein the memory controller is further configured to:

determine a third starting key based upon a predetermined default seed key and a physical page address associated with a third group of data;

randomize the third group of data using a deterministic sequence of keys corresponding to the third starting key; and store the randomized third group of data into a third physical page of the non-volatile memory.

44. The apparatus as recited in claim 32 wherein:

the randomized group of data is ECC encoded and non-randomized ECC redundancy bytes are stored in the non-volatile memory.

45. The apparatus as recited in claim 32 wherein:

all page header information written into the non-volatile memory is randomized.

46. The apparatus as recited in claim 45 wherein:

control blocks for a flash file system are randomized using a physical page address rather than a logical page address.

47. The apparatus as recited in claim 45 wherein:

boot blocks for a flash file system are randomized using a predetermined default seed key, and using a physical page address corresponding to the boot block.

48. The apparatus as recited in claim 32 wherein the deterministic sequence of keys comprises:

a number M of separate scrambling keys, each comprising M-bits, wherein each respective scrambling key N (KeyN) corresponds to an N-bit circular rotation of a predetermined seed key (Key0).

49. The apparatus as recited in claim 48 wherein the randomizing comprises a bit-by-bit XOR operation using the deterministic sequence of M-bit scrambling keys.

50. The apparatus as recited in claim 49 wherein each successive scrambling key in the deterministic sequence is a single-bit rotation of the preceding scrambling key.

51. The apparatus as recited in claim 49 wherein each successive scrambling key in the deterministic sequence is a bit-wise rotation of the seed key by a calculated number of bits.

52. The apparatus as recited in claim 51 wherein the calculated number of bits for the successive key depends on the current key.

53. The apparatus as recited in claim 52 wherein the calculated number of bits for the successive key also depends on the page offset value and the D-word offset value of the corresponding successive word.

54. The apparatus as recited in claim 32 wherein the deterministic sequence of keys comprises:
a pseudo-random sequence of keys generated by a linear feedback shift register (LFSR) having a starting value corresponding to the starting key.

55. A method for storing information in a non-volatile memory, said method comprising:
determining a starting key based upon a seed key and a logical page address associated with a group of data;
randomizing the group of data using a deterministic sequence of keys corresponding to the starting key; and
storing the randomized group of data into a physical page of the non-volatile memory;
wherein the deterministic sequence of keys comprises a number M of separate scrambling keys, each comprising M-bits, wherein each respective scrambling key N (KeyN) corresponds to an N-bit circular rotation of a predetermined seed key (Key0);
wherein the randomizing comprises a bit-by-bit XOR operation using the deterministic sequence of M-bit scrambling keys;
wherein each successive scrambling key in the deterministic sequence is a bit-wise rotation of the seed key by a calculated number of bits; and
wherein the calculated number of bits for the successive key depends on the current key and also depends on the page offset value and the D-word offset value of the corresponding successive word.

56. An apparatus comprising:
a non-volatile memory; and
a memory controller configured to:
determine a starting key based upon a seed key and a logical page address associated with a group of data;
randomize the group of data using a deterministic sequence of keys corresponding to the starting key; and
store the randomized group of data into a physical page of the non-volatile memory;
wherein the deterministic sequence of keys comprises a number M of separate scrambling keys, each comprising M-bits, wherein each respective scrambling key N (KeyN) corresponds to an N-bit circular rotation of a predetermined seed key (Key0);
wherein the randomizing comprises a bit-by-bit XOR operation using the deterministic sequence of M-bit scrambling keys;
wherein each successive scrambling key in the deterministic sequence is a bit-wise rotation of the seed key by a calculated number of bits; and
wherein the calculated number of bits for the successive key depends on the current key and also depends on the page offset value and the D-word offset value of the corresponding successive word.

57. A method for storing information in a non-volatile memory, said method comprising:
determining a starting key based upon a seed key and a logical page address associated with a group of data;
randomizing the group of data using a deterministic sequence of keys corresponding to the starting key;
storing the randomized group of data into a physical page of the non-volatile memory; and
storing, into more than one location within the physical page of the non-volatile memory, additional information from which the starting key may be determined without knowledge of the logical page address.

* * * * *